(12) United States Patent
Sugiyama et al.

(10) Patent No.: US 6,574,662 B2
(45) Date of Patent: *Jun. 3, 2003

(54) SYSTEM FOR NETWORK-DEVICE MANAGEMENT INCLUDING COLLECTING AND STORING OF DEVICE ATTRIBUTES THAT CHANGE WITH TIME AND DEVICE ATTRIBUTES THAT HARDLY CHANGE WITH TIME

(75) Inventors: Akira Sugiyama, Kawasaki (JP); Noboru Hamada, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,874

(22) Filed: Mar. 9, 1999

(65) Prior Publication Data

US 2003/0041134 A1 Feb. 27, 2003

(30) Foreign Application Priority Data

| Mar. 12, 1998 | (JP) | 10-061659 |
| Mar. 31, 1998 | (JP) | 10-087646 |
| Jan. 25, 1999 | (JP) | 11-015491 |

(51) Int. Cl.[7] .................. G06F 15/173
(52) U.S. Cl. ............ 709/223; 709/224; 709/226; 707/102
(58) Field of Search ................ 709/223, 224, 709/226; 707/102

(56) References Cited

U.S. PATENT DOCUMENTS

| 5,960,176 | A | * | 9/1999 | Kuroki et al. ...... 709/223 |
| 6,122,639 | A | * | 9/2000 | Babu et al. ...... 707/103 R |
| 6,182,225 | B1 | * | 1/2001 | Hagiuda et al. ...... 713/201 |
| 6,219,703 | B1 | * | 4/2001 | Nguyen et al. ...... 709/224 |

* cited by examiner

Primary Examiner—Nabil El-Hady
(74) Attorney, Agent, or Firm—Fitzpatrick, Cella, Harper & Scinto

(57) ABSTRACT

Conventionally, crowded network traffic occurs because duplicated data exchange is performed between network management software and network devices. A network-device management method according to the present invention includes a search step of searching a device connected to a network, an acquisition step of acquiring a value of a device attribute relating to the device detected in the search in the search step, and a storage step of storing values of a plurality of device attributes relating to the device detected in the search in a storage device. If the value of each of the plurality of device attributes relating to the device detected in the search is stored in the storage device, the value stored in the storage device is used. It is thereby possible to prevent crowded network traffic by transmitting and receiving only necessary packets in a network-device search sequence.

15 Claims, 25 Drawing Sheets

```
BOOL MIBOpen ( in *port, ADDR *addr );                                    901

BOOL MIBReadObjects ( int port, int count, MIBOBJ *obj,                   902
                     CALLBACK respproc );

BOOL MIBWriteObjects ( int port, int count, MIBOBJVAL *objval,            903
                      CALLBACK respproc );

BOOL MIBClose ( in port );                                                904 typedef VOID ( *CALLBACK ) ( int port, ADDR *addr, INT result,            905
                             int count, MIBOBJVAL *objval );
```

PRIOR ART

FIG.9

|  | 1201 | 1202 | 1203 | 1204 | 1205 |
|---|---|---|---|---|---|
|  | NETWORK ADDRESS | PORT | DEVICE TYPE | STATE OF DEVICE | EQUIPMENT INFORMATION |
|  | 192. 1. 16 130 | 0x12FE | LBP | Ready | 2000-SHEET DECK |
|  | 192. 1. 16 150 | 0x2501 | Copier | Jam | Sorter |
|  | ... | ... | ... | ... | ... |

1220 DETECTED-DEVICE TABLE

FIG.12A

|  | 1211 | 1212 | 1213 | 1214 | 1215 |
|---|---|---|---|---|---|
|  | NETWORK ADDRESS | PORT | DEVICE TYPE | STATE OF DEVICE | EQUIPMENT INFORMATION |
|  | 192. 1. 16 130 | NULL | LBP | Ready | 2000-SHEET DECK |
|  | 192. 1. 16 150 | NULL | Copier | Jam | Sorter |
|  | ... | ... | ... | ... | ... |

1230 IMMEDIATELY-PRECEDING-DETECTED-DEVICE TABLE

FIG.12B

| 2001 | 2002 | 2003 | 2004 | 2005 | 2006 |
|---|---|---|---|---|---|
| NETWORK ADDRESS | PORT | DEVICE TYPE | STATE OF DEVICE | EQUIPMENT INFORMATION | SHEET SIZE |
| 192. 1. 16 130 | 0x12FE | LBP | Ready | 2000-SHEET DECK | A4 |
| 192. 1. 16 150 | 0x2501 | Copier | Jam | Sorter | A3 |
| ... | ... | ... | ... | ... | ... |

2020 DETECTED-DEVICE TABLE

FIG.20A

| 2011 | 2012 | 2013 | 2014 | 2015 | 2016 |
|---|---|---|---|---|---|
| NETWORK ADDRESS | PORT | DEVICE TYPE | STATE OF DEVICE | EQUIPMENT INFORMATION | SHEET SIZE |
| 192. 1. 16 130 | NULL | LBP | Ready | 2000-SHEET DECK | A4 |
| 192. 1. 16 150 | NULL | Copier | Jam | Sorter | A3 |
| ... | ... | ... | ... | ... | ... |

2030 IMMEDIATELY-PRECEDING-DETECTED-DEVICE TABLE

FIG.20B

SYSTEM FOR NETWORK-DEVICE MANAGEMENT INCLUDING COLLECTING AND STORING OF DEVICE ATTRIBUTES THAT CHANGE WITH TIME AND DEVICE ATTRIBUTES THAT HARDLY CHANGE WITH TIME

BACKGROUND OF THE INVENTION

1. Field of the Invention

The present invention relates broadly to a computer network. More particularly, the invention relates to a network-device management apparatus and method including network management software, and to a recording medium.

2. Description of the Related Art

Recently, local area networks (LANs) in which computers are interconnected have come to be widely used. Such a local area network is constructed over a floor or the entirety of a building, a group of buildings (an enclosure), a local area, or a larger area. In some cases, such networks are interconnected, or connected to a worldwide network. In such interconnected LANs, various techniques for interconnecting hardware apparatuses and a plurality of network protocols are used.

In a simple isolated LAN, each user can manage apparatuses. That is, the user can exchange (add, remove or replace) apparatuses, install software, or check problems.

However, in a large-scale complicated LAN or a large group of interconnected LANS, "management" is required. The word "management" indicates both management by a human network manager and management according to software used by the manager. In the present application, "management" indicates management according to software for managing the entire system, and "user" indicates a person who uses network management software. The user is usually a person responsible for system management. By using network management software, the "user" can obtain management data on the network and change the data.

A large-scale network system is a dynamic system which always requires increase or removal of apparatuses, updating of software, detection of problems, and the like. In general, various systems possessed by various people and supplied by various suppliers are present.

Various methods for managing network devices on a network constituting such a large-scale network system have been provided by many standardization organizations. The International Organization for Standardization (ISO) has provided a general-purpose standard framework called an Open System Interconnection (OSI) model. The OSI model of a network control protocol is called a Common Management Information Protocol (CMIP). The CMIP is a common network management protocol used in Europe.

Recently, a modified protocol relating to the CMIP called a Simple Network Management Protocol (SNMP) is being used as a network management protocol which can be more commonly used (see "Introduction to TCP/IP Network Management for Pratical Management" written by M. T. Rose and translated by Takeshi Nishida, first edition Aug. 20, 1992 by Toppan Printed Company, Limited).

According to the SNMP network management technique, a network management system includes at least one network management station (NMS), some nodes to be managed, each having agents, and a network management protocol used by the management station or the agents in order to exchange management information. By communicating with agent software of a node to be managed using network management software of the NMS, the user can obtain management data on the network and change the data.

The word "agent" indicates software operating as a background process at each node to be managed. When the user requests management data from a node to be managed on the network, the network management software includes an object identifier (to be described later) in a management packet or frame, and transmits the resultant data to the agent of the node to be managed.

The agent interprets the object identifier and obtains data corresponding to the object identifier. The agent includes the data in the packet and transmits the resultant data to the network management software. At that time, the agent calls, in some cases, a corresponding process in order to obtain the data.

The agent also holds data relating to the node to be managed in the form of a database. This database is called an MIB (management information base). FIG. 4 illustrates the concept of the structure of the MIB. As shown in FIG. 4, the MIB has a data structure in the form of a tree, where an identifier is uniquely provided for each node. In FIG. 4, the identifier for a node is defined based on the number written in the parentheses. For example, the identifier for a node 401 shown in FIG. 4 is 1. Since a node 402 is a child of the node 401, the identifier for the node 402 is 1·3. Similarly, the identifier for a node 403 is 1·3·6·1·2. Such an identifier for a node is an object identifier. In FIG. 4, a part of the MIB defined as a standard is extracted and shown.

The structure of the MIB is called a Structure of Management Information (SMI), and is defined by RFC1155 Structure and Identification of Management Information for TCP/IP-based Internets.

Next, the SNMP will be described. A PC (personal computer) where the network management software operates (hereinafter termed an "manager") and a network device to be managed (where an SNMP agent operates) (hereinafter termed an "agent") communicate with each other using the SNMP. The SNMP has five commands, which are called Get-request, Get-next-request, Get-response, Set-request and Trap. FIG. 8 illustrates a manner in which these commands are exchanged between the manager and the agent.

The Get-request and Get-next-request commands are commands transmitted from the manager to the agent. The agent which has received these commands transmits the Get-response command to the manager in order to notify the manager of the value of the MIB object (801 and 802).

The Set-request command is a command transmitted from the manager to the agent in order to set the value of the MIB object of the agent. The agent which has received this command transmits the Get-request command to the manager in order to notify the manager of the result of the setting (803).

The Trap command is a command transmitted from the agent to the manager in order to notify the manager of a change in the agent's own state (804).

FIG. 7 is a diagram illustrating the formats of commands other than the Trap command, i.e., the Get-request, Get-next-request, Get-response and Set-request commands (generically termed "SNMP messages"). In FIG. 7, reference numeral 700 represents an SNMP message. The SNMP message includes a version 701, a community name 702, and a PDU 703. Reference numeral 710 represents the detail of the PDU 703.

The PDU 710 includes a PDU type 711, a request ID 712, an error status 713, an error index 714, and MIB information 715. A value for identifying the command is stored in the PDU type 711. The values 0, 1, 2 and 3 of the PDU type 711 indicates the Get-request, Get-next-request, Get-response and Set-request commands, respectively. A value indicating error information is stored in the error status 713. A pair comprising an MIB object identifier and the value of the MIB object is stored in the MIB information 715.

Next, a large-scale network which requires management will be described. FIG. 1 is a diagram illustrating a network where a network board (NB) 101 for connecting a printer to the network is connected to a printer 102 having an open architecture. The NB 101 is connected to a local area network (LAN) 100 via a LAN interface, such as an Ethernet interface 10 Base-2 having a coaxial connector, 10 Base-T having RJ-45, or the like.

A plurality of PCs, such as a PC 103, a PC 104 and the like, are also connected to the LAN 100. These PCs can communicate with the NB 101 under the control of a network operating system. It is possible to assign one of the PCs, such as the PC 103 or the like, to be used as a network management unit. A printer, such as a printer 105 connected to the PC 104, may be connected to each PC.

A file server 106 is also connected to the LAN 100 in order to manage access to a file stored in a large-capacity (for example, 10 billion bytes) network disk 107. A print server 108 causes connected printers 109a and 109b, the printer 105 provided at a remote location, and the like to perform printing. Any other peripheral apparatuses (not shown) may also be connected to the LAN 100.

In order to realize efficient communication between various network members, the network shown in FIG. 1 can use network software, such as Novell, UNIX or the like. Although any network software may be used, software called NetWare (trade name) provided by Novell Corporation (for a detailed description of this software package, see on-line documentation included in the NetWare package available from the Novell Corporation) may, for example, be used.

The configuration shown in FIG. 1 will now be briefly described. The file server 106 performs transmission/reception of a data file between LAN members, storage of the data file, cueing and cashing, and operates as a file management unit. For example, data files provided by the PCs 103 and 104 are transmitted to the file server 106. The file server 106 arranges the received data files in order, and transmits the data files to the printer 109a in accordance with a command from the print server 108.

Each of the PCs 103 and 104 generates data files, transmits the generated data files to the LAN 100, receives data files from the LAN 100, and displays and/or processes the data files. Although PCs are illustrated in FIG. 1, any other computer apparatuses which are suitable for executing network software may also be used. For example, when UNIX software is used, UNIX work stations may be connected to the network. These UNIX work stations are used together with the illustrated PCs in an appropriate situation.

Usually, the LAN 100 provides a somewhat local user group, such as a user group on one floor or a plurality of consecutive floors within one building, with service. A wide area network (WAN) may be constructed if users are present at locations remote from each other, for example, when users are located in different buildings or different states. The WAN is basically an aggregate of some LANs formed by connecting the LANs via a high-speed digital line, such as a high-speed Integrated Services Digital Network (ISDN) or the like.

Accordingly, as shown in FIG. 1, the WAN is constructed by interconnecting the LANs 100, 110 and 120 via a MODEM (modulator-demodulator)/transponder 130 or a backbone 140 according to simple electric connection using a plurality of buses. Dedicated PCs are connected to each of the LANs. Although not always necessary, a file server and a print server are usually connected to the LAN.

Accordingly, as shown in FIG. 1, LAN 110 includes PCs 111 and 112, a file server 113, a network disk 114, a print server 115, and printers 116 and 117. On the other hand, LAN 120 is configured only by PCs 121 and 122. An apparatus connected to each of the LANs 100, 110 and 120 can access the function of another apparatus connected to another of the LAN's.

An agent may be mounted on a network board for connecting a printer to the network. It is thereby possible to manage the printer by means of network management software. The user can acquire information relating to the printer to be managed and change the state of the printer using the network management software. More specifically, for example, the user can acquire a character string displayed on a liquid-crystal display of the printer, or change designation of the default sheet-feeding cassette.

Next, a description will be provided of a case in which the network board (NB) mounting the agent is connected to the printer. As shown in FIG. 2, the NB 101 is incorporated within an internal expansion I/O slot of the printer 102, thus becoming an "embedded" network node performing the following processing and having a data storage function. This configuration of the NB101 has the feature of providing characteristic auxiliary functions for controlling and managing a large multi-area WAN. The auxiliary functions include, for example, control and observation of the state of the printer from a remote location on the network (such as the office of the network controller), automatic control of the printer configuration in order to provide an initial environment to guarantee the next user after each printing job, a printer log which can be accessed via the network in order to specify the amount of load of the printer or to provide a schedule for exchanging the toner cartridge, and statistics of use.

The important factor in the design of the NB is a function to access printer control from the NB 101 via a two-way interface, such as a shared memory or the like. An interface other than a shared memory, such as an SCSI (small computer system interface) or the like, is in some cases, used. Information relating to the state of the printer is thereby transmitted to the NB 101 or an external network node, and many auxiliary functions can be mounted. Printing-image information and control information are formed by a microprocessor provided on the NB 101, written in the shared memory, and read by the printer 102. Similarly, the printer-state information is transmitted from the printer 102 to the shared memory, and read by the NB processor.

FIG. 2 is a partly cut-away view illustrating a state in which the NB 101 is installed in the printer 102. As shown in FIG. 2, the NB 101 is configured by a phase plate 101b for network connection, and a printed circuit board 101a on which the phase plate 101b is mounted. The NB 101 is connected to a printer interface card 150 via a connector 170. The printer interface card 150 directly controls the printer engine of the printer 102. Printing data and printer control commands are input from the NB 101 to the printer interface card 150 via the connector 170. On the other hand, the printer-state information is output from the printer interface card 150 via the connector 170. The NB 101 transmits the printer-state information to the LAN 100 via a network connector provided at the phase plate 101b. The printer 102 can also receive printing data from a conventional serial port 102a or parallel port 102b.

FIG. 3 is a block diagram illustrating electric connection between the printer 102 and the LAN 100. The NB 101 is connected to the LAN 100 and the printer 102 via a LAN interface and the printer interface card 150, respectively. The NB 101 includes a microprocessor 301 for controlling the NB 101, a ROM (read-only memory) 303 storing operation programs for the microprocessor 301, a RAM (random access memory) 302 utilized as a working area when the microprocessor 301 executes a program, and a shared memory 200 for exchange of data between the NB 101 and the printer interface card 150. These units are interconnected via an internal bus.

A program NB for operating the NB 101 as an SNMP agent is stored in the ROM 303. The microprocessor 301 operates in accordance with the program stored in the ROM 303, and uses the RAM 302 as a working area. The microprocessor 301 also uses the shared memory 200 as a buffer region for communicating with the printer interface card 150.

A microprocessor 151 of the printer interface 150 exchanges data with the NB 101 via the shared memory 200 in the NB 101. The microprocessor 151 also communicates with a printer engine 160 which actually operates a printing mechanism.

Next, a description will be provided of a PC where the network management software is executed. FIG. 5 is a block diagram illustrating the configuration of a PC 500 which can execute the network management software. In FIG. 5, the PC 500 can execute the network management software, and is equivalent to the PC 103 shown in FIG. 1. The PC 500 includes a CPU 501 which executes the network management software stored in a ROM 502 or a hard disk (HD) 511, or supplied from a floppy-disk drive (FD) 512, and controls respective devices connected to a system bus 504.

A RAM 503 operates as the main memory, a working area or the like of the CPU 501. A keyboard controller (KBC) 505 controls instructions input through a keyboard (KB) 509, a pointing device (not show) and the like. A CRT controller (CRTC) 506 controls display on a CRT display (CRT) 510. A disk controller (DKC) 507 controls the hard disk (HD) 511 and the floppy disk drive (FD) 512, each of which stores a boot program, various application programs, editing files, user files, the network management software and the like. A network interface card (NIC) 508 bidirectionally exchanges data with agents or network apparatuses.

Next, a description will be provided of the configuration of the network management software in a conventional approach. A network management apparatus in the conventional approach is realized by a PC similar to the PC which can realize the network management apparatus shown in FIG. 5. The network management software according to the present invention, which is the main subject of entirety of the following description, is stored in the hard disk (HD) 511. In the entirety of the following description, unless otherwise mentioned, the main subject of execution in hardware is the CPU 501, and the main subject of control in software is the network management software. In this conventional approach, although Windows 95® (provided by Microsoft Corporation) is assumed to be used as an OS (operating system), the OS is not limited to this software.

The network management software according to the present invention may be stored in and supplied from a storage medium, such as a floppy disk, a CD(compact disc)-ROM or the like. In this case, the program is read from the storage medium using the floppy-disk drive 512, a CD-ROM drive (not shown) or the like, and is installed in the hard disk (HD) 511.

FIG. 6 is a diagram illustrating the configuration of modules of the network management software according to the conventional approach. This network management software is stored in the hard disk 511 shown in FIG. 5, and is executed by the CPU 501. At that time, the CPU 501 uses the RAM 503 as a working area.

In FIG. 6, reference numeral 601 represents a device-list module, which displays a summary of network devices connected to the network (the manner of displaying the summary is described below with reference to FIG. 12). Reference numeral 602 represents an entirety-control module, which controls other modules based on instructions from the device list module 601.

A configurator 603 is a module which performs special processing relating to network setting by an agent. A search module 604 searches network devices connected to the network. The summary of network devices searched by the search module 604 is displayed on the device-list module 601. A NetWare-job module 605 acquires the state of a printing job from the network server using NetWare API 616 (for the NetWare API, see, for example, "NetWare Programmer's Guide for C" published by the Novell Corporation, which is available from the Novell Corporation).

Each of a UI (user interface) module A 606 and a UI module B 607 displays a device detail window (described below). A UI module is provided for each network device whose detail information is to be displayed. Each of a control module A 608 and a control module B 609 performs control peculiar to each network device whose detail information is to be acquired. As UI modules, a control module is provided for each network device whose detail information is to be acquired. Each of the control module A 608 and the control module B 609 acquires MIB information from a network device to be managed using an MIB module 610, converts data of the MIB information if necessary, and provides the UI module A 606 and the UI module B 607 with the data.

The MIB module 610 performs conversion between an object identifier and an object key. The object key is a 32 bit integer which corresponds to each object identifier. The object identifier is a variable-length identifier. In the network management software according to the present invention, a fixed-length identifier corresponding to each object identifier is internally used because it is troublesome to deal with a variable-length identifier when mounting the network management software. A module superior to the MIB module 610 deals with the MIB information using the object key. The network management software is thereby easily mounted.

Reference numeral 611 represents an SNMP module, which transmits and receives an SNMP packet. Reference numeral 612 represents a common transport module, which operates as an interface with an inferior protocol for carrying the SNMP packet. Actually, one of an IPX (Internet Packet Exchange) handler 613 and a UDP (User Datagram-Protocol) handler 614 transfers a packet according to a protocol selected by the user when the network management software operates. In order to mount the UDP handler 614, WinSock API 617 is used (for Winsock, see the specification of Windows Socket API v1.1, which is available from a number of sources, and is incorporated, for example, in Visual C++, which is a compiler provided by the Microsoft Corporation).

A current protocol 615 used by the configurator 603 indicates one of the IPX protocol and the UDP protocol selected by the user when the network management protocol operates.

A description will now be provided of an interface between the search module 604 and the MIB module 610 shown in this conventional approach.

The MIB module 610 provides a superior module with an API (application programming interface) of a C language shown in FIG. 9. First, in order to open an interface (termed a "port") for an assigned address with the MIB module 610, the superior module calls a MIBOpen function 901. The MIB module 610 transmits an identifier for identifying the opened interface (termed a "port identifier") to the superior module (the value is transmitted to a first argument port of the MIBOpen function 901). Then, the superior module exchanges data with the MIB module using the port identifier. The value of the port identifier is termed a port value.

The assigned address indicates an address in a protocol in operation, and is an IP address and a NetWare address in the cases of the IP protocol and the NetWare protocol, respectively. It is also possible to assign a broadcast address in each protocol. When a port is opened by assigning a broadcast address, it is possible to communicate with a plurality of network devices which respond to the broadcast address.

When the superior module comes to be in a state of not using the port, it closes the port by calling an MIBClose function 904.

When the superior module acquires the value of an MIB object, it calls a MIBReadObjects function 902. When calling the MIBReadObjects function 902, the port identifier and the object key of the MIB object to be acquired are assigned. At the same time, the MIB module 610 assigns the address for a call-back function for notifying the superior module of the value of the acquired MIB object.

By calling the MIBReadObjects function 902, a Get-request command in the SNMP is transmitted to the network. Then, as shown in FIG. 8, an agent responding to the Get-request command transmits a Get-response command.

When the superior module writes a value into the MIB object, it calls a MIBWriteObjects function 903. When calling the MIBWriteObjects function 903, the superior module assigns a port identifier, an object key of the MIB object where the value is to be written, and the value to be written. At the same time, the superior module assigns the address of the call-back function for notifying the superior module of the result of the writing from the MIB module 610.

By calling the MIBWriteObjects function 903, a Get-request command in the SNMP is transmitted to the network. Then, as shown in FIG. 8, an agent responding to the Get-request command transmits a Get-response command.

The call-back function notifies the superior module of the result of the MIBReadObjects function 902 or the MIBWriteObjects function 903. More specifically, the address of the network device and the contents of the received Get-response command are notified to the superior module.

When calling the MIBReadObjects function 902 by opening a port by assigning a broadcast address, the address of a packet carrying the Get-request command transmitted to the network (an IP packet and an IPX packet in the cases of the IP protocol and the NetWare protocol, respectively). Accordingly, this packet is received by a plurality of network devices, so that a plurality of agents respond to this Get-request command. As a result, the manager receives a plurality of Get-response commands. In this case, the call back function performs a plurality of notification operations having different network device addresses with the same port identifier. By checking the address, the superior module can know to which network device each call back relates.

More specific flows will now be described. In response to a request from the superior module, the MIB module 610 performs processing, such as conversion from an object key into an object identifier, or the like, and requests the SNMP module 611 to transmit a Get-request command.

In response to the request of the command from the MIB module 610, the SNMP module 611 generates the PDU 710 shown in FIG. 7 in the RAM 503, and transmits an SNMP packet to the common transport module 612.

The common transport module 612 performs processing, such as addition of a header, or the like, in accordance with a protocol selected by the user when the network management software operates. When the protocol selected by the user is a TCP/IP protocol and a NetWare protocol, the common transport module 612 transmits the packet to the WinSock API module 617 and the NetWare API module 616, respectively.

A description will now be provided assuming that the protocol selected by the user is the TCP/IP protocol. The WinSock API module 617 converts the received packet into an IP packet, and requests the OS to transmit the packet to the network. Then, the OS writes the packet in the RAM 503 into the NIC 508 via the system bus 504. Then, the NIC 508 converts the written packet into a packet in the form of frames, and transmits the packet to the LAN 100.

On the other hand, a packet from the network device is received by the NIC 508. The NIC 508 notifies the OS of the reception of the packet by performing an interrupt. The OS reads the packet from the NIC 508 via the system bus 504, and stores the read packet in the RAM 503. The OS determines a protocol relating to the packet based on the protocol selected by the user or the received packet, and transmits the packet to the WinSock module 617 and the NetWare API module 616 when the protocol is the TCP/IP protocol and the NetWare protocol, respectively.

A description will now be provided of the case that the protocol as the result of the determination is the TCP/IP protocol. The WinSock API module 617 determines if the packet is to the module's own address by checking the address of the packet. If the result of the determination is negative, the packet is abandoned. If the result of the determination is affirmative, the WinSock API module 617 transmits the packet to the common transport module 612 by starting the UPD handler 614.

The common transport module 612 performs processing, such as removal of the transport header, or the like, and transmits the SNMP packet to the SNMP module 611. The SNMP module 611 transmits MIB information within the PDU 710 to the MIB module 610 by removing the SNMP header. The MIB module 610 converts the MIB information into a form defined by the MIB API, and notifies the superior module of the value of the MIB object according to the call-back function.

A file necessary for installing the network management software is usually recorded in a physical medium, such as a floppy disk (FD), a CD-ROM or the like, and is distributed, or transmitted via the network. After thus acquiring the file necessary for installing the network management software, the user starts install according to a predetermined install procedure.

The install procedure of the network management software is the same as the install procedure of any other ordinary software. That is, after the user starts an installer for the network management software in the personal computer (PC), the installer automatically executes install of the network management software. The installer also copies the file necessary for the network management software to the hard disk of the PC, causes the user to input information if necessary, and corrects or newly forms the file necessary for the network management software.

Next, a description will be provided of a search sequence in the network management software in the conventional approach. FIG. 10 is a diagram illustrating a search sequence in the network management software in the coventional approach.

In FIG. 10, search module 1030 is the same as the search module 604 shown in FIG. 6. As other modules in the network management software, this search module 1030 is executed by the CPU 501 shown in FIG. 5 in the PC 103 shown in FIG. 1.

Device 1031 is connected to the network and is a device where an SNMP agent operates. Device 1031 corresponds, for example, to the NB 101. Similarly, device 1032 corresponds to the NB 118.

When an instruction to start search is provided from a superior module, the search module 1030 assigns a broadcast address, and transmits an SNMP packet for acquiring the state of the device and the device type (1001). Since the broadcast address is assigned, this packet is transmitted to all network devices connected to the network.

Each network device mounting an SNMP agent transmits a response packet in response to the SNMP packet (1002 and 1003).

The search module 1030 which has received the response packet from the network device transmits an SNMP packet to each network device in order to acquire more detailed information. More specifically, in FIG. 10, an SNMP packet is transmitted in process 1004 for the response packet in process 1002, and an SNMP packet is transmitted in process 1006 for the response packet in process 1003. This transmission of the SNMP packet is termed "acquisition of information" for each device.

The reason why the value of the MIB object is not inquired in the transmission of the SNMP packet in process 1001 while the value is inquired in the transmission of the SNMP packet in process 1004 or 1006 is as follows. That is, if many MIB objects are inquired at a time with one packet, there is the possibility that the length of response packets from network devices exceeds the maximum length (484 bytes) of the packet allowed in the SNMP protocol. In such a case, an error "too big in the SNMP protocol" is transmitted from the network devices, so that information cannot be obtained at all. Accordingly, the value of the MIB object is inquired by dividing the packet into a plurality of SNMP packets.

In particular, in this conventional approach, the SNMP packet in process 1004 or 1006 requires optional equipment mounted in each network device. If many units of equipment are mounted in the network device, the possibility that the length of the response packet from the network device is large is high. If the values of other MIB objects are simultaneously inquired, the possibility that the length of response packets exceeds the maximum length (484 bytes), becomes higher. Accordingly, it is safer to make a packet that is to make inquiry of optional equipment an independent packet.

The network device which has received the SNMP packet transmits a response packet. More specifically, packet transmission in process 1005 and packet transmission in process 1006 are performed for the reception of the packet in process 1004 and the reception of the packet in process 1006, respectively.

Upon expiration of a device-response timer 1021, the search module 604 notifies the superior module of information relating to network devices which have been obtained (process 1021). This notification is termed notification of the result of search.

Upon expiration of a search-interval timer 1022, search of network devices is resumed. Since the processing from process 1008 to process 1014 is the same as the processing from process 1001 to process 1007, further description thereof will be omitted.

In the above-described conventional approach, however, there are problems in that processes 1004 and 1011, processes 1005 and 1012, processes 1006 and 1013, and processes 1007 and 1014 are duplicate communication processes, thereby causing crowded network traffic.

SUMMARY OF THE INVENTION

According to the present invention, when a plurality of sets of information relating to network devices include information which can change with time and information which hardly change with time, crowded network traffic is prevented by only inquiring information which can change with time.

That is, in the present invention, crowded network traffic is prevented by transmitting and receiving only necessary packets in a search sequence.

According to one aspect of the present invention, a network-device management apparatus includes search means for searching a device connected to a network, acquisition means for acquiring a value of a device attribute relating to the device detected in the search by the search means, and storage means for storing values of a plurality of device attributes relating to the device detected in the search. When the value of each of the plurality of device attributes relating to the device detected in the search is stored in the storage means, the value stored in the storage means is used.

According to another aspect of the present invention, a network-device management method includes a search step of searching a device connected to a network, an acquisition step of acquiring a value of a device attribute relating to the device detected in the search in the search step, and a storage step of storing values of a plurality of device attributes relating to the device detected in the search in storage means. When the value of each of the plurality of device attributes relating to the device detected in the search is stored in the storage means, the value stored in the storage means is used.

According to still another aspect of the present invention, a storage medium capable of being read by a computer which medium stores a program to be executed by the computer. The program includes a search step of searching a device connected to a network, an acquisition step of acquiring a value of a device attribute relating to the device detected in the search in the search step, and a storage step of storing values of a plurality of device attributes relating to the device detected in the search in storage means. When the value of each of the plurality of device attributes relating to the device detected in the search is stored in the storage means, the value stored in the storage means is used.

The foregoing and other objects, advantages and features of the present invention will become more apparent from the following description of the preferred embodiments taken in conjunction with the accompanying drawings.

BRIEF DESCRIPTION OF THE DRAWINGS

FIG. 9 is a diagram illustrating functions provided by a MIB module;

FIG. 12A is a diagram illustrating a detected-device table in the first embodiment;

FIG. 12B is a diagram illustrating an immediately-preceding-detected device table in the first embodiment;

FIG. 20A is a diagram illustrating a detected-device table in the second embodiment;

FIG. 20B is a diagram illustrating an immediately-preceding-detected-device table in the second embodiment;

DESCRIPTION OF THE PREFERRED EMBODIMENTS

Preferred embodiments of the present invention will now be described in detail with reference to the drawings.

First Embodiment

Figure 10:
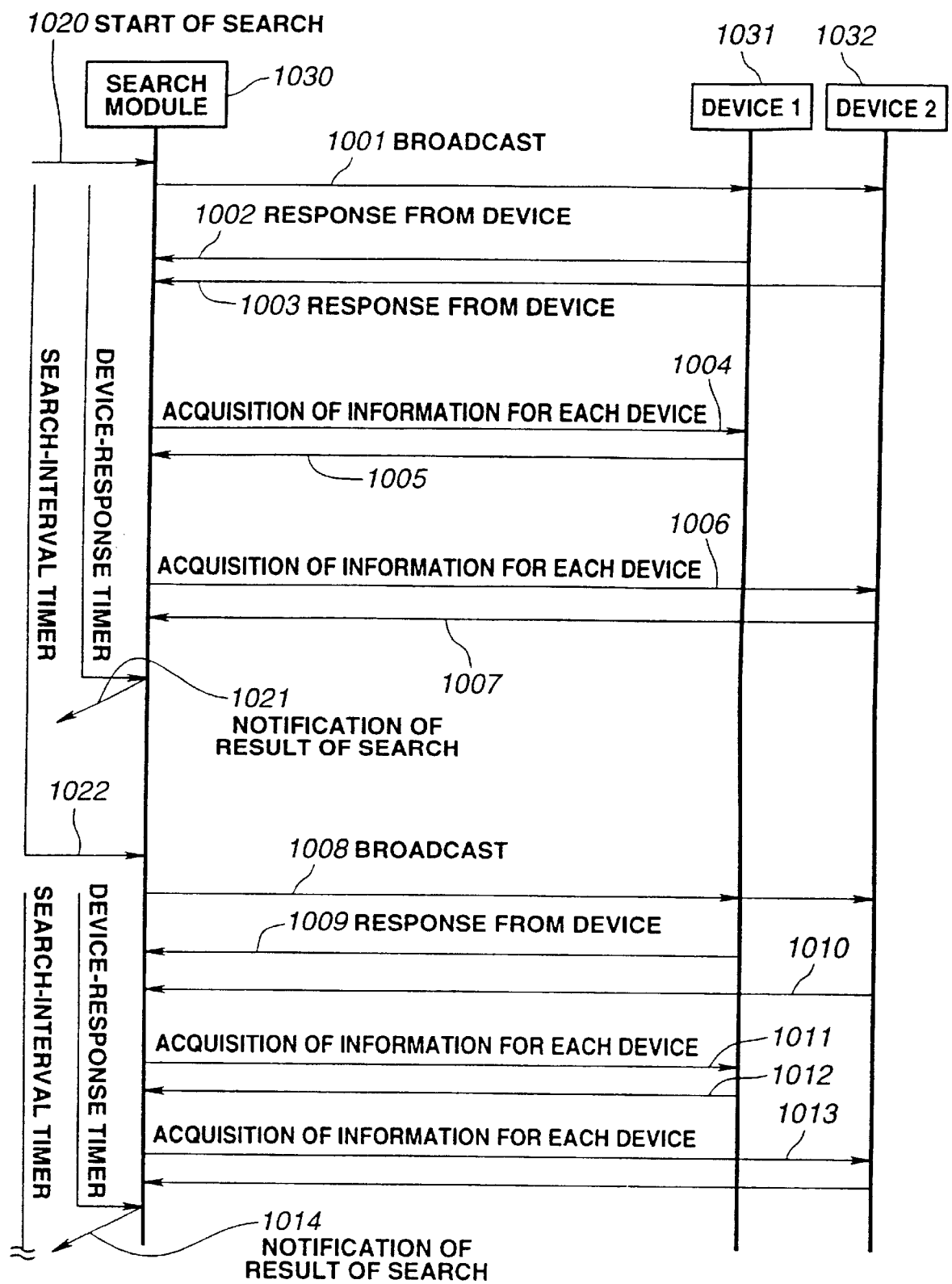
FIG. 10 is a diagram illustrating a communication sequence between a search module and network devices in a conventional approach.
Figure 11:
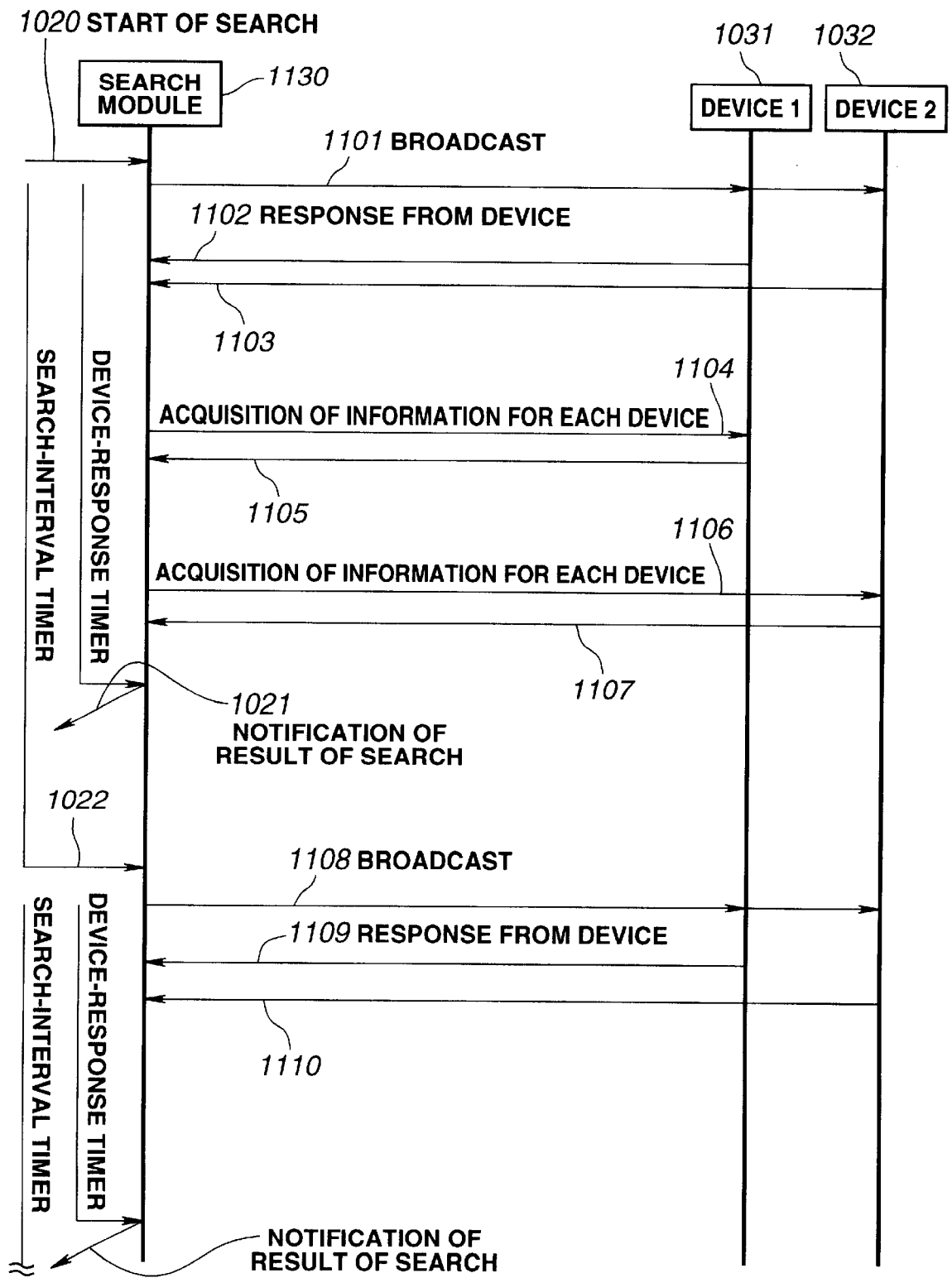
FIG. 11 is a diagram illustrating a communication sequence between a search module and network devices according to a first embodiment of the present invention.

FIG. 11 is a diagram illustrating a communication sequence between network management software and network devices on a network according to a first embodiment of the present invention. Particularly, FIG. 11 illusrates a manner in which a search module 1130 searches network devices present on the network. Processes 1020, 1021, 1022, 1031 and 1032 shown in FIG. 11 are the same as the processes having the same numbers in FIG. 10.

Figure 5:
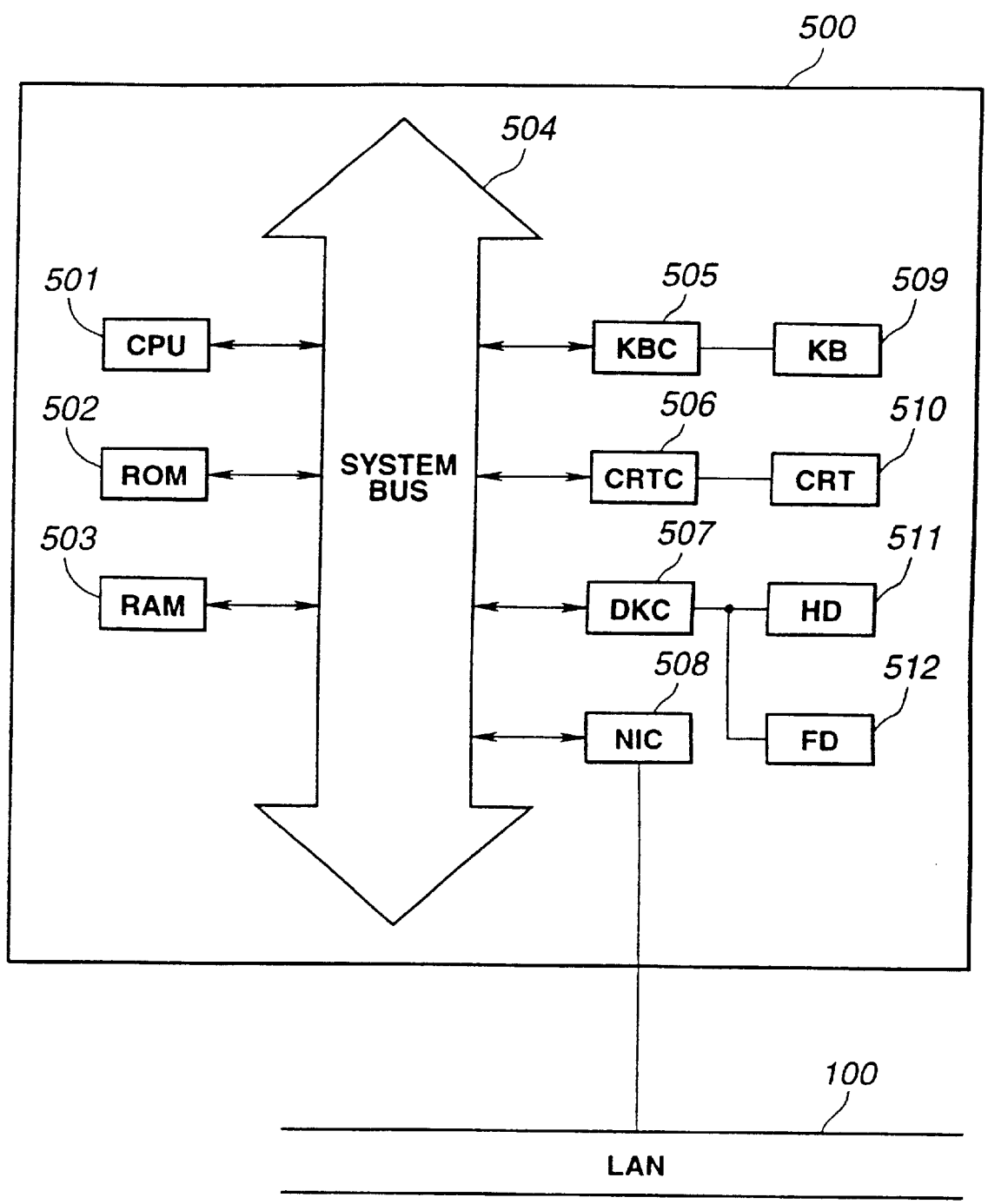
FIG. 5 is a block diagram illustrating the configuration of a PC which can execute network management software.
Figure 6:
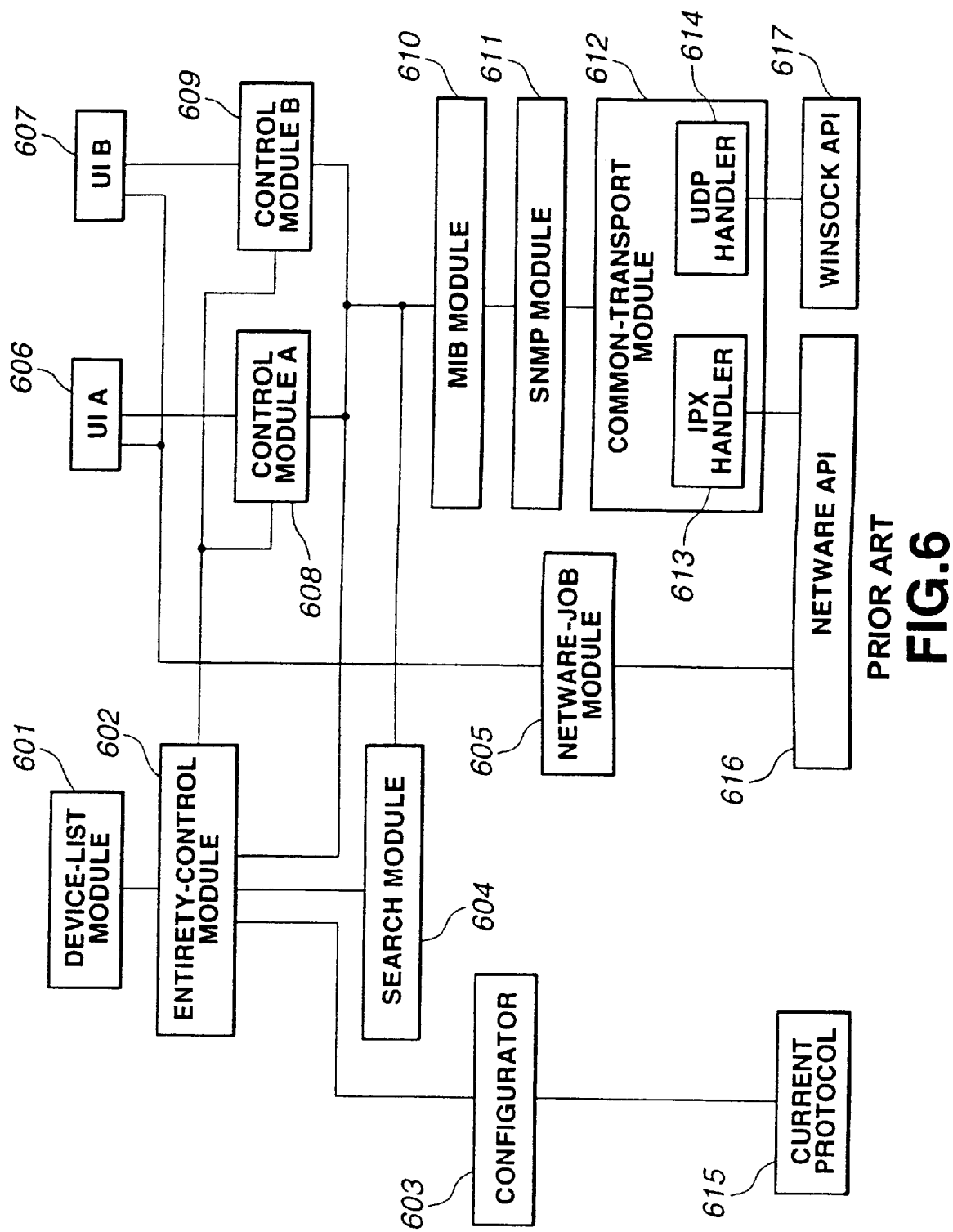
FIG. 6 is a diagram illustrating the configuration of modules of the network management software.

In FIG. 11, a search module 1130 indicates a search module of network management software according to the present invention, and is equivalent to the search module 604 shown in FIG. 6. As other modules in the network management software in the invention, this search module 1030 is executed by the CPU 501 shown in FIG. 5 in the PC 103 shown in FIG. 1.

Processing from process 1101 to process 1110 represents communication between the search module 1130 and network devices 1031 and 1032. The contents of this communication will be described in detail with reference to flowcharts (described below).

FIGS. 12A and 12B are diagrams illustrating the data structures of a detected-device table 1220 and an immediately-preceding-detected-device table 1230 which are used by the search module 1130 in order to store information relating to detected devices. These data structures are held in the RAM 503 shown in FIG. 5.

Information relating to detected network devices is registered in the detected-device table 1220. Every time a network device has been detected, one line is added to the detected-device table 1220.

Information registered in the detected-device table 1220 will now be described. The network address of each detected network device is registered in a network-address column 1201. A port value transmitted from the MIBOpen function 901 provided by the MIB module 610 is registered in a port column 1202.

The type of the network device is registered in a device-type column 1203. The current state of the network device is registered in a device-state column 1204. An optional unit of equipment mounted on the network device is registered in a equipment-information column 1205.

More specifically, in FIG. 12A, two network devices are registered in the detected-device table 1220. The first network device has a network address of 192.1.16.130. The port value for communicating with this network device is 0x12FE. The device type of this network device is an "LBP", and a "2,000-sheet deck" is mounted as optional equipment. The state of the device is "Ready".

The second network device has a network address of 192.1.16.150. The port value for communicating with this network device is 0x2501. The device type of this network device is a "Copier", and a "Sorter" is mounted as optional equipment. It can be understood from the state of the device that "Jam" is currently generated.

In the above-described information, the port 1202 and the state of the device 1204 can dynamically change with time.

A unique value is allocated to the port every time the search module 604 calls the MibOpen function 901. The state of the device indicates the current state of the network device, and can change with a change in the state of the network device. The state of the device information is inquired in the communication 1101 for searching network devices, and are transmitted from the network devices in the communication operations 1102 and 1103.

The immediately-preceding-detected-device table 1230 (shown in FIG. 12B) holds information relating to the network devices detected in the preceding search. Since the immediately-preceding-detected-device table 1230 has the same data structure as the detected-device table 1220, futher description thereof will be omitted.

How to use these tables will be described in detail with reference to flowcharts (to be described later).

Figure 13:
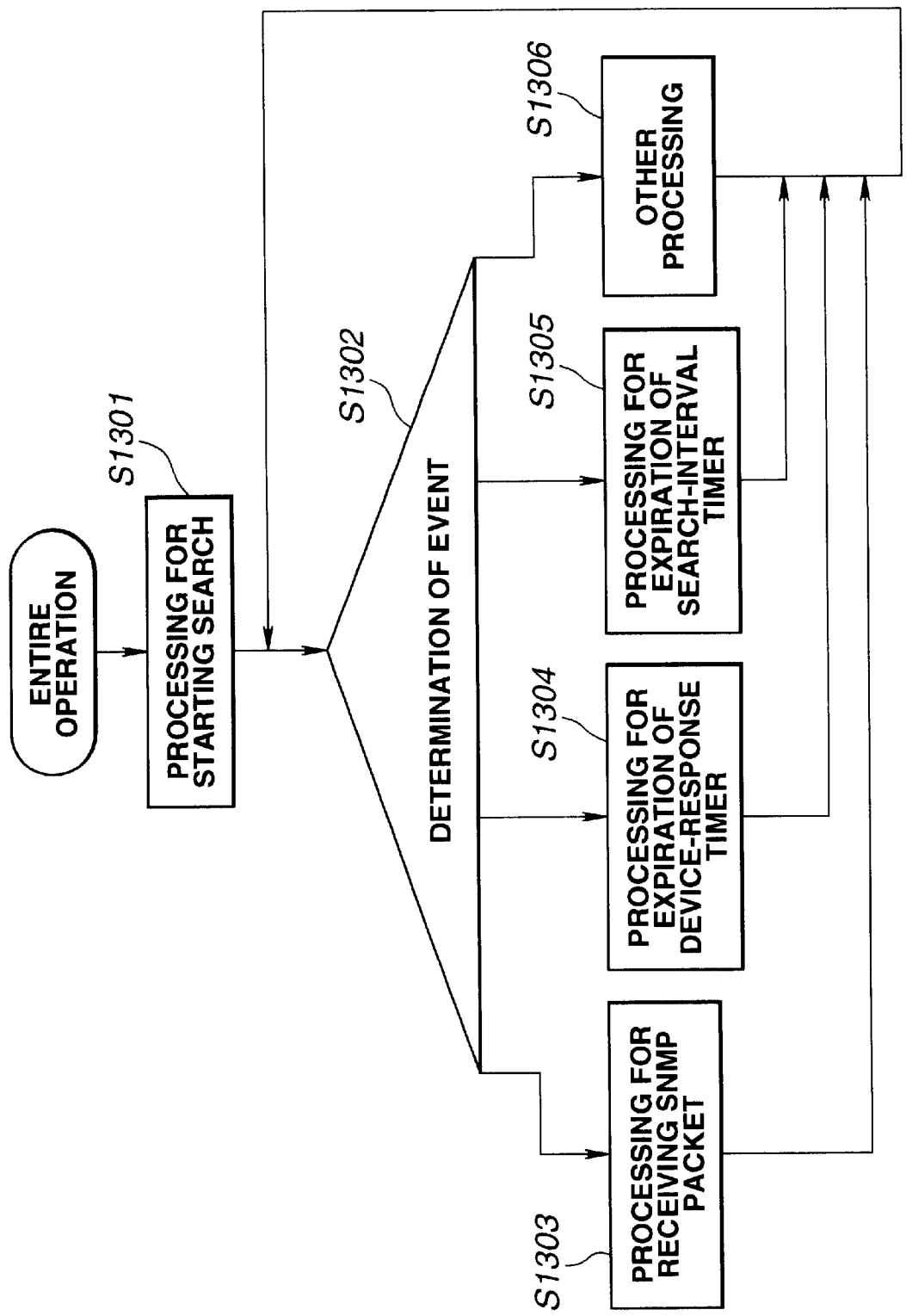
FIG. 13 is a flowchart illustrating the operation of the entirety of network management software in the first embodiment.

FIG. 13 is a flowchart illustrating the entirety of the operation of the network management software executed in the PC 103. When the program has been started, first, in step S1301, processing for starting search of a network device is performed. Then, in step S1302, it is determined whether the generated event is reception of an SNMP packet (response packet), expiration of the device-response timer, expiration of the search-interval timer, or other event (including generation of no event).

The process proceeds to an appropriate step (from among steps S1303–S1306) in accordance with the generated event. Upon completion of processing in each step, the process returns to step S1302.

Figure 14:
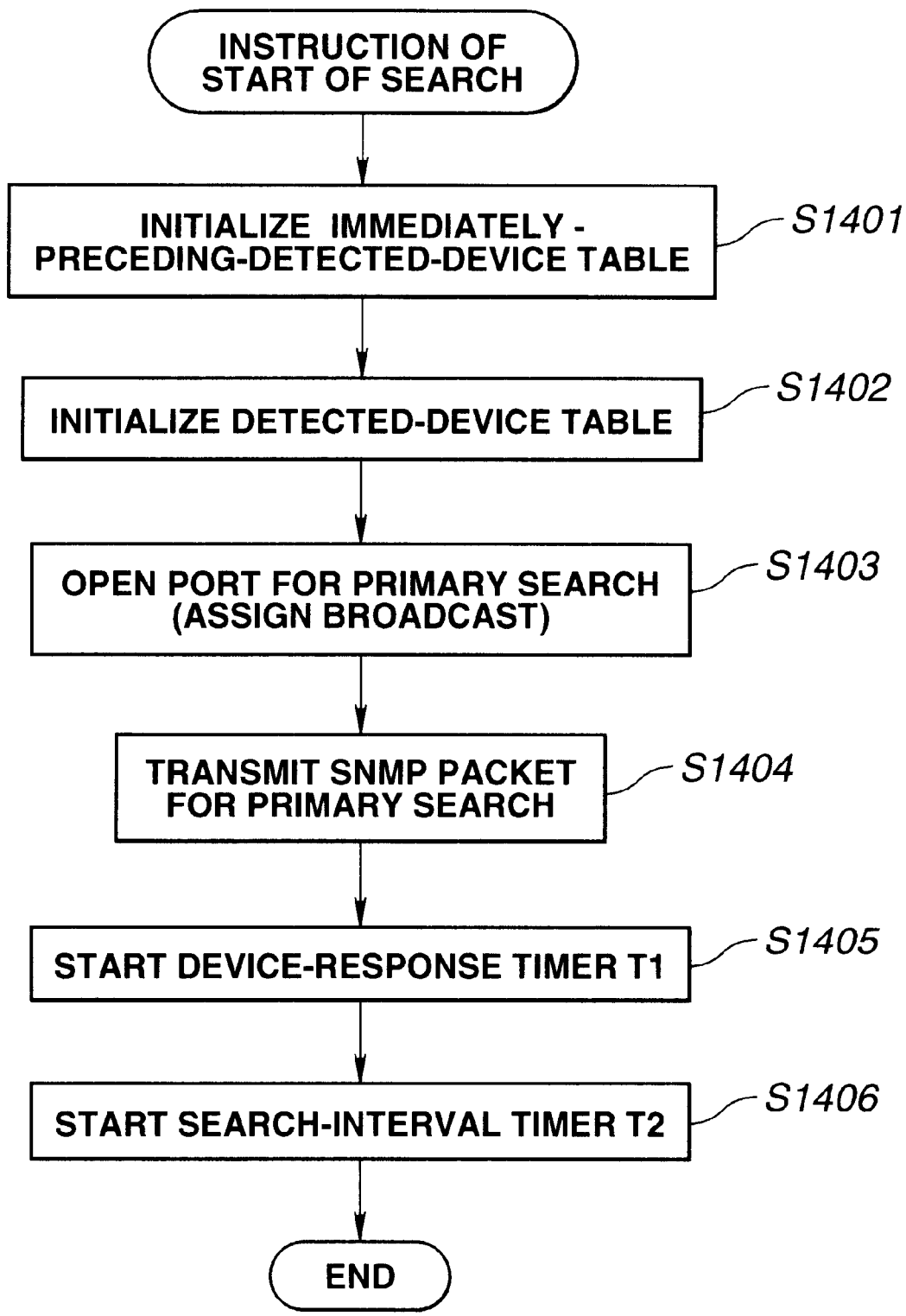
FIG. 14 is a flowchart illustrating the operation when a search module starts to search network devices in the first embodiment.

FIG. 14 is a flowchart illustrating the operation when the search module 604 starts search. This processing corresponds to the processing of step S1301. First, in step S1401, all of the contents of the immediately-preceding-detected-device table are erased to initialize the table. Then, in step S1402, all of the contents of the detected-device table are erased to initialize the table.

Figure 1:
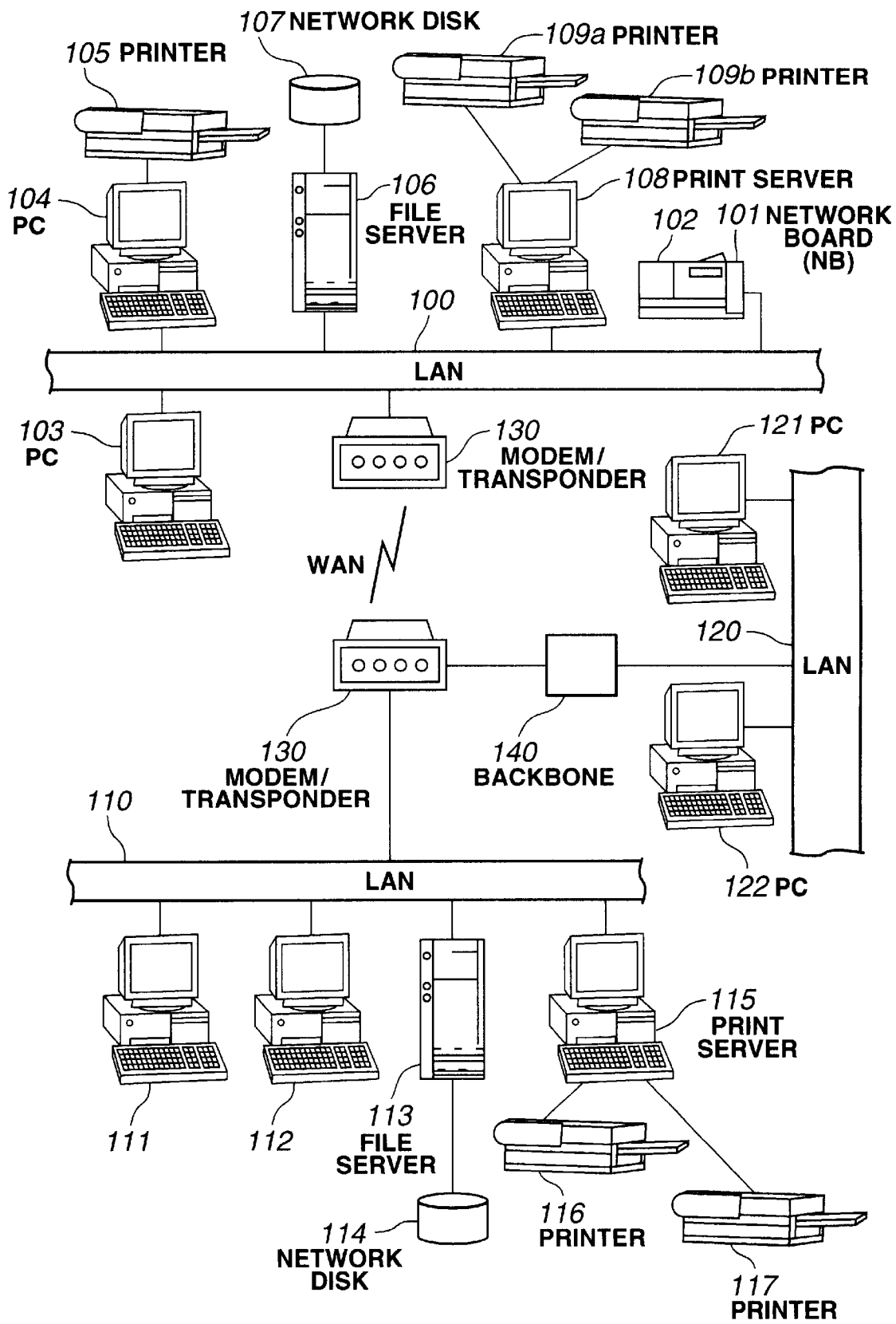
FIG. 1 is a diagram illustrating a network when a network board for connecting a printer to the network is mounted on an open-architecture printer.
Figure 2:
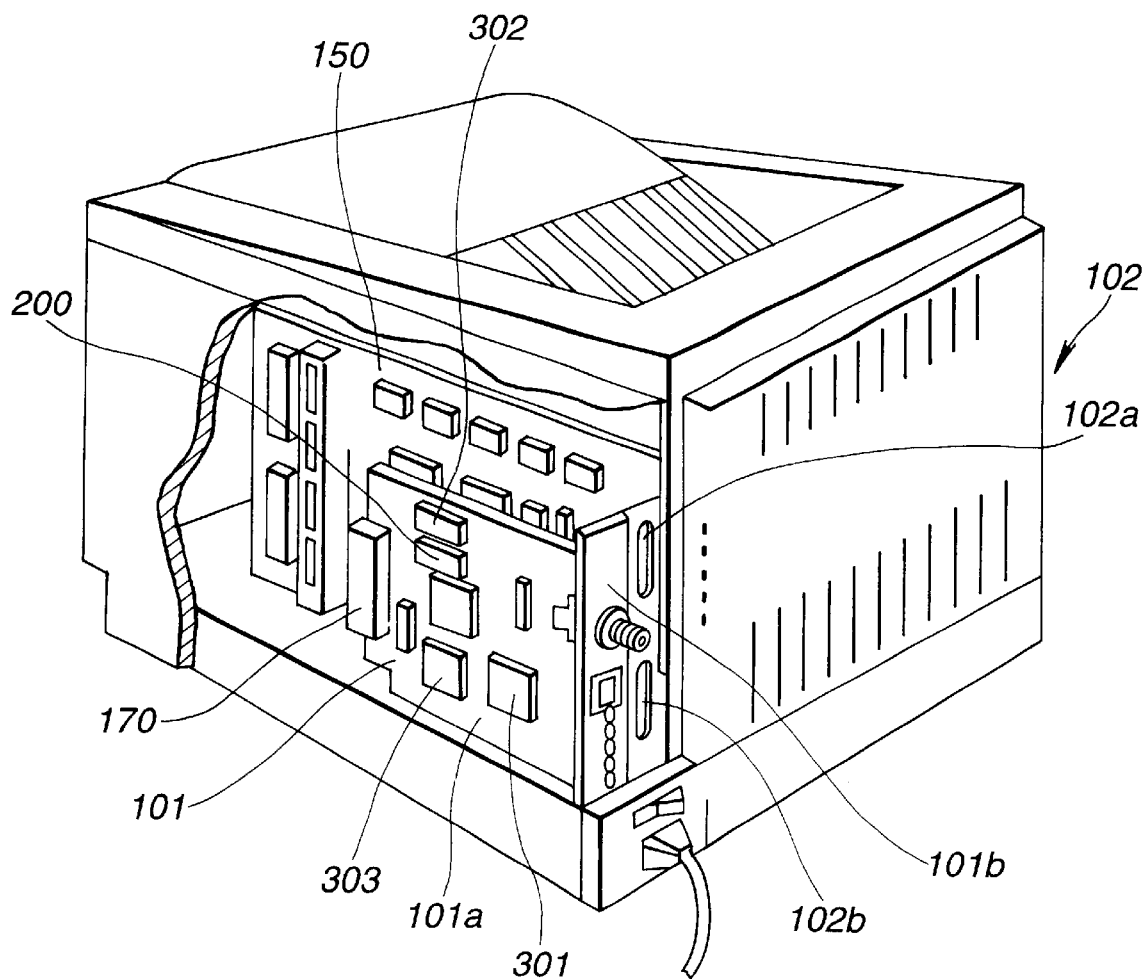
FIG. 2 is a view, partly cut-away, of a printer on which a network board having agents mounted thereon is mounted.
Figure 3:
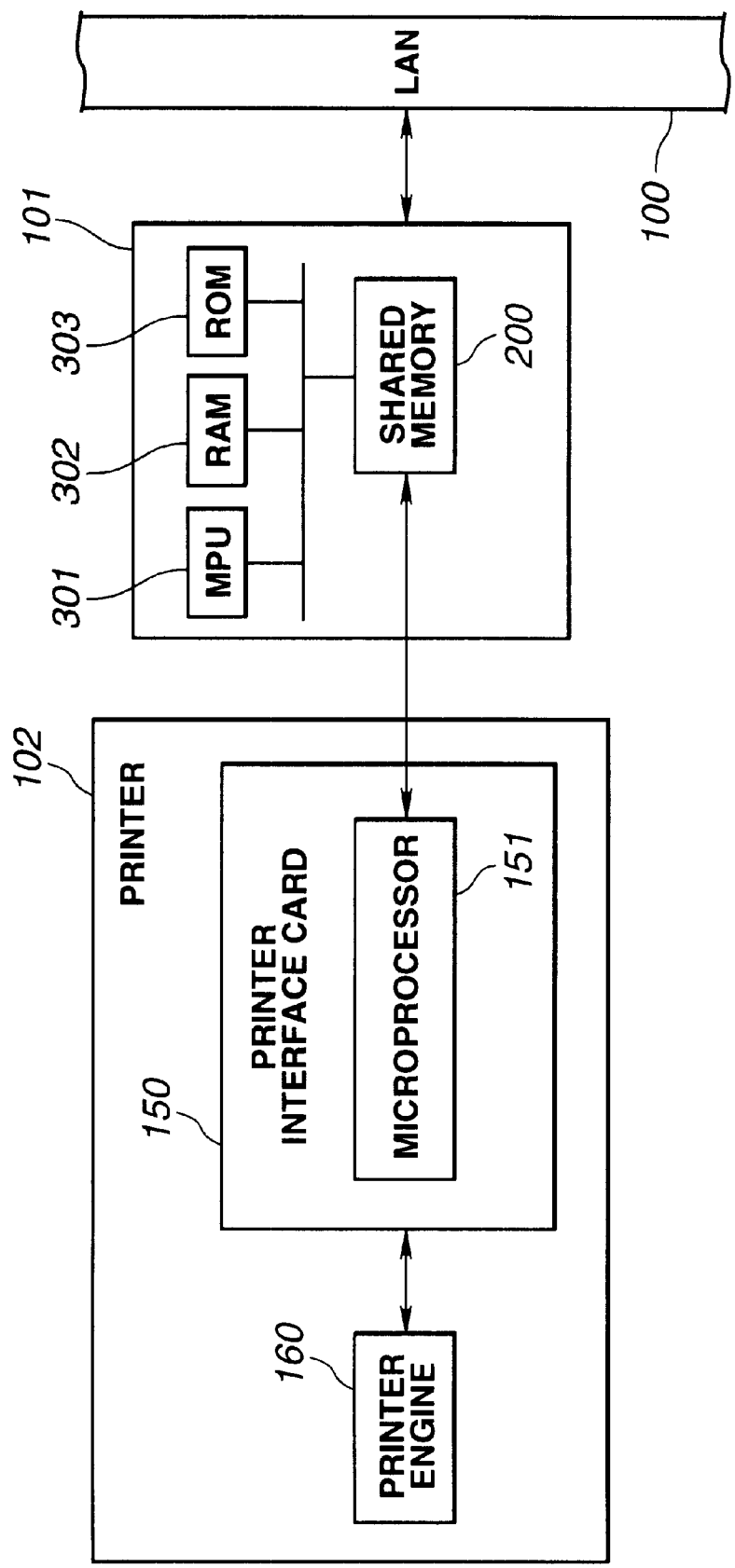
FIG. 3 is a block diagram illustrating electric connection between a network board, a printer and a LAN.
Figure 4:
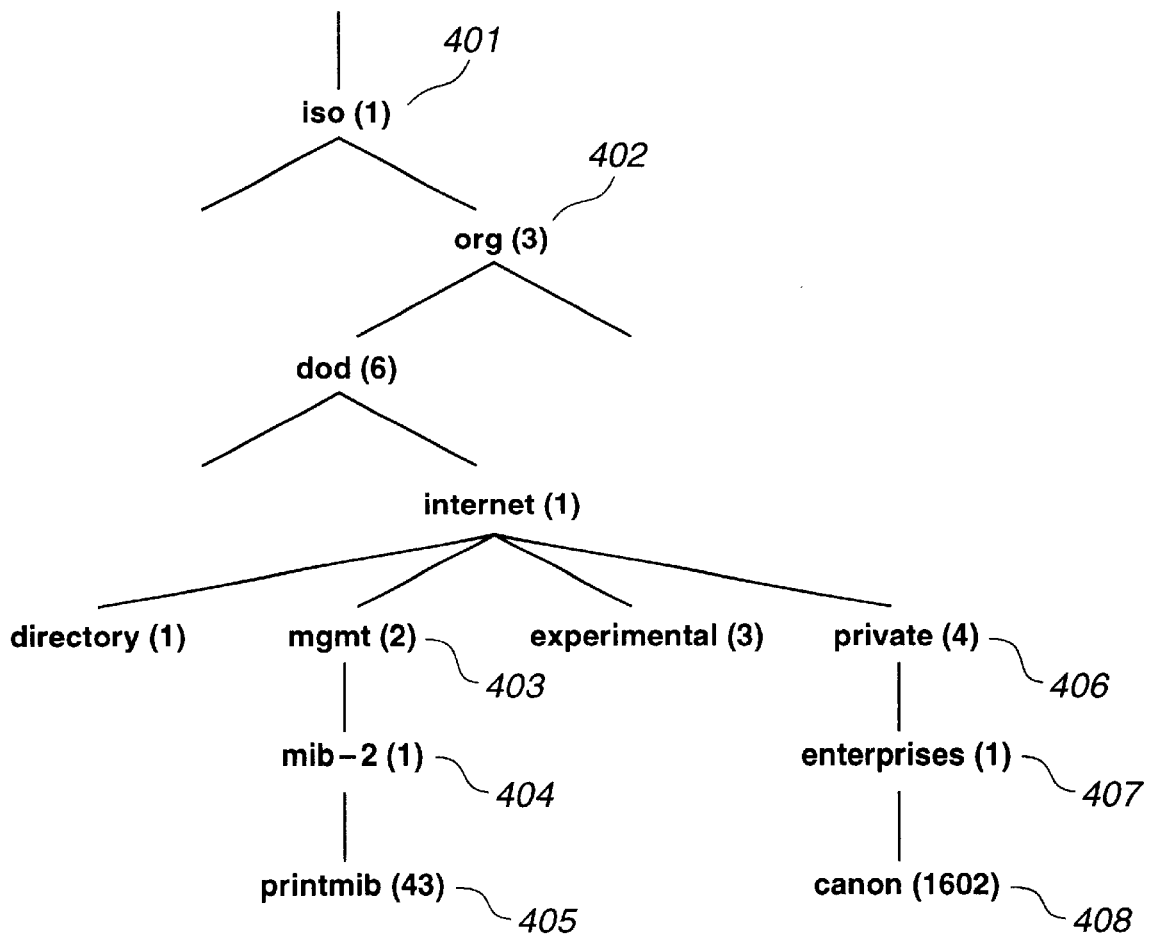
FIG. 4 is a schematic diagram illustrating the structure of a MIB.

Then, the process proceeds to step S1403, where a port for primary search is opened according to a broadcast address by calling the MIBOpen function 901 provided by the MIB module 610 shown in FIG. 6, and the value of the port is stored in the RAM 503 shown in FIG. 1. The port for primary search is termed a primary search port.

Then, in step S1404, the MIBReadObject function 902 is called by using the port value obtained in step S1403 as an argument. At that time, two MIB object keys relating to the device type and the state of the device are assigned as MIB objects. Thus, the communication 1101 shown in FIG. 11 is performed.

Since the address in the communication 1101 is a broadcast address, the contents of the communication are transmitted to all network devices connected to the LAN 100 shown in FIG. 1, including, of course, the devices 101 and 118, i.e., the devices 1031 and 1032 shown in FIG. 11.

Then, in step S1405, the device-response timer T1 is started. Then, in step S1406, the search-interval timer T2 is started.

Figure 15:
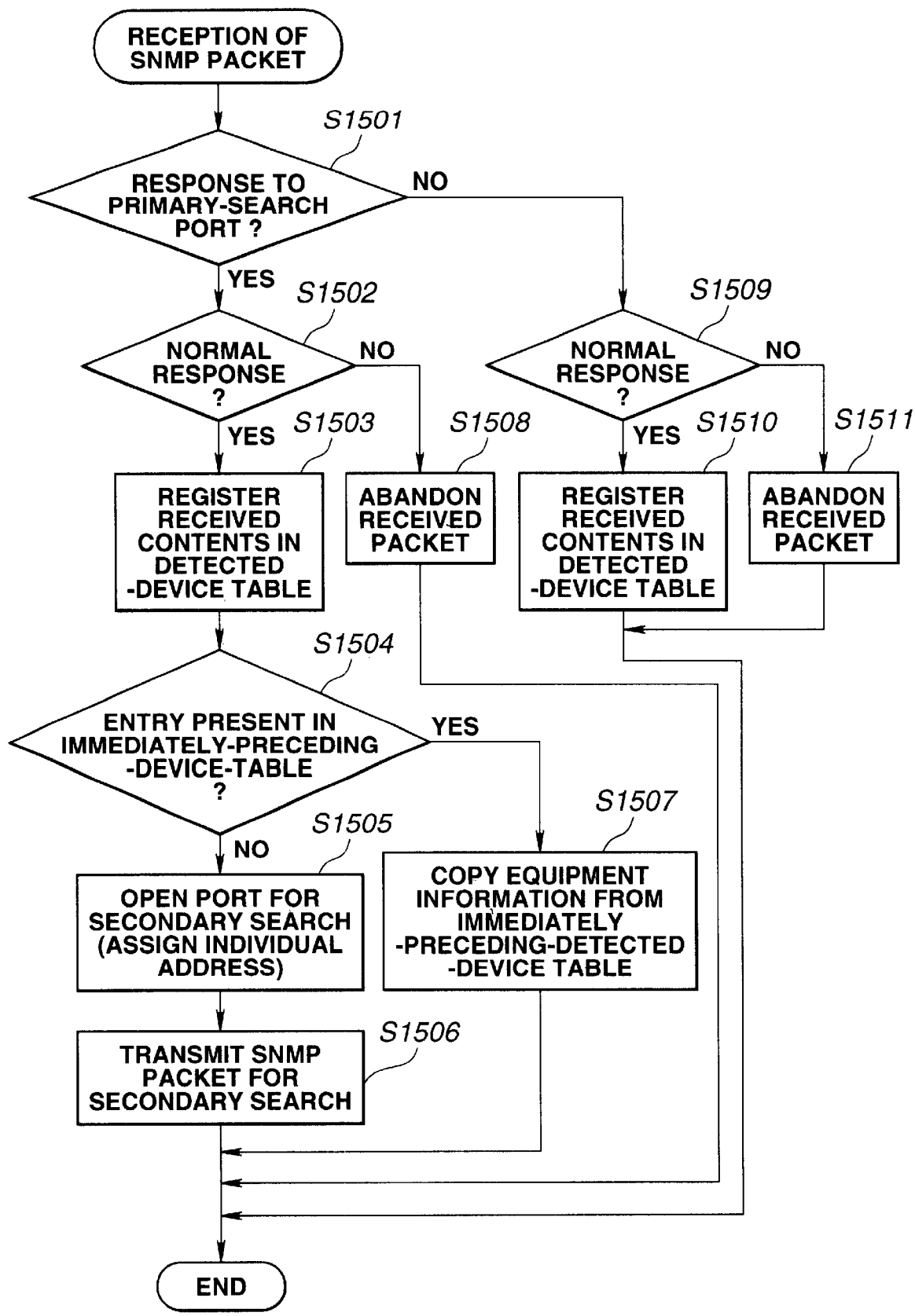
FIG. 15 is a flowchart illustrating processing when an SNMP packet has been received in the first embodiment.

FIG. 15 is a flowchart illustrating the operation when an SNMP packet has been received. This processing corresponds to the processing in step S1303 shown in FIG. 13. This operation is performed when an SNMP packet has been received in communication processes 1102, 1103, 1105, 1107, 1109 and 1110 shown in FIG. 11.

When an SNMP packet has been received, first, in step S1501, it is determined if the received packet is a response packet for a primary search port. In this process, it is determined if the port value of the second argument relating to a call-back function of the search module called when the SNMP packet has been received corresponds to the port value stored in step S1403 shown in FIG. 14. If the result of the determination in step S1501 is affirmative, the process proceeds to step S1502 assuming that the communication is for the primary port. If the result of the determination in step S1501 is negative, the process proceeds to step S1509. In FIG. 11, the processes 1102, 1103, 1109 and 1110 represent communication to the primary search port.

Figure 7:
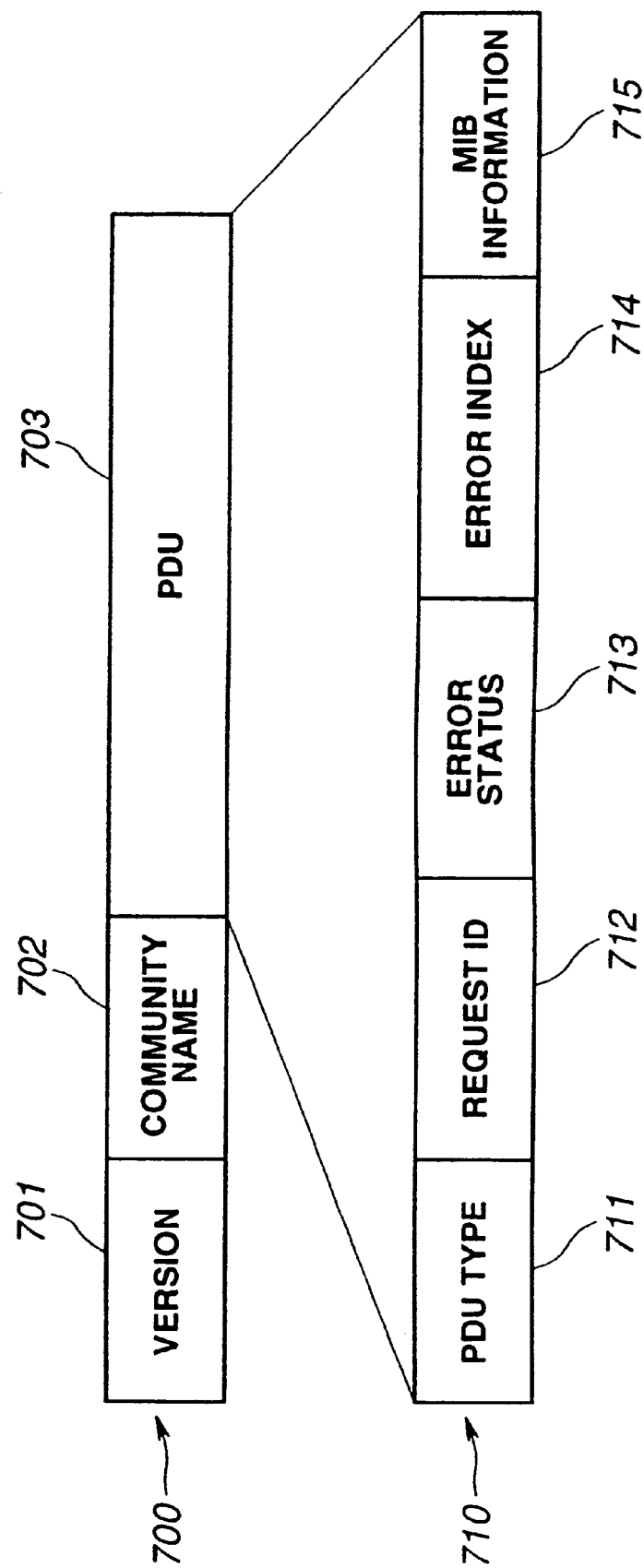
FIG. 7 is a diagram illustrating the format of a packet when an SNMP protocol is used.
Figure 8:
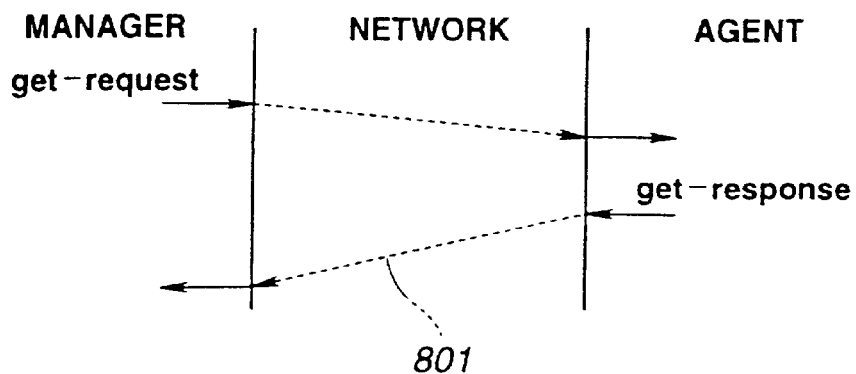
FIG. 8 is a digram illustrating transmission/reception of SNMP commands between a manager and an agent.
Figure 8:
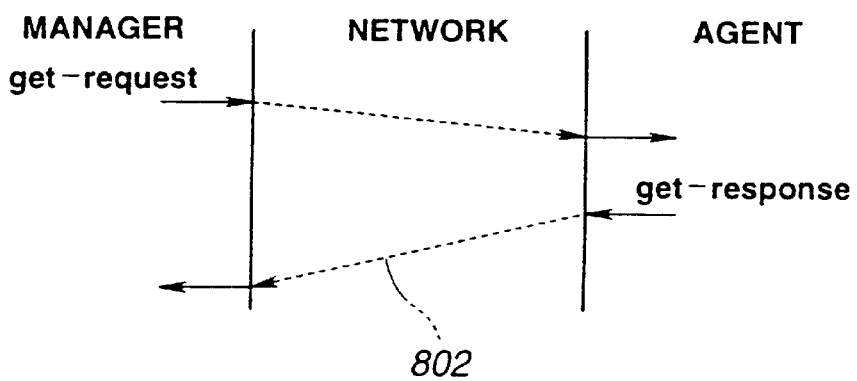
Figure 8:
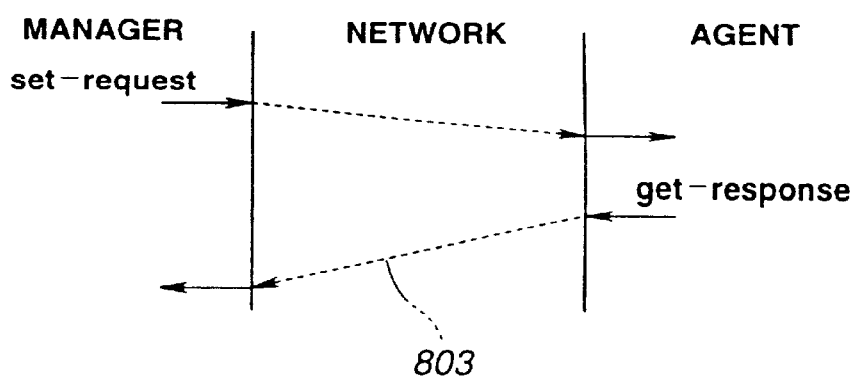
Figure 8:
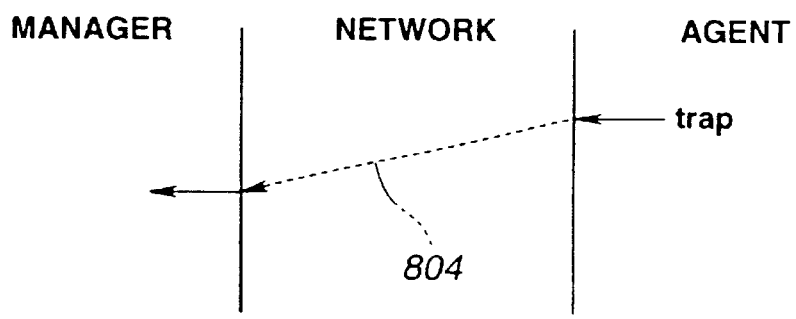

Then, in step S1502, it is determined if the response is a normal response. The normal response indicates that, as described with reference to FIG. 7, the error status 713 of the SNMP packet is 0. If the result of the determination in step S1502 is affirmative, the process proceeds to step S1503. If the result of the determination in step S1502 is negative, the process proceeds to step S1508. In step S1509, the same determination as in step S1502 is also performed.

In step S1503, the received contents are registered in the detected-device table 1220. Since both the device type and the state of the device have been assigned as MIB objects in step S1403 shown in FIG. 14, the received contents include the values of these two MIB objects. Accordingly, these two values and the network address in the first argument of the call-back function are registered in the detected-device table 1220.

Then, in step S1504, it is determined if the network address in the first argument of the call-back function is registered in the network-address column 1211 of the immediately-preceding-detected-device table 1230. If the result of the determination in step S1504 is negative, the process proceeds to step S1505. If the result of the determination in step S1504 is affirmative, the process proceeds to step S1507.

In step S1505, a port is opened in order to individually perform communication to each network device. In the first embodiment, this port is termed a secondary search port. More specifically, the MIBOpen function is called using the network address of the network device detected in step S1503 as an argument, and the transmitted port value is registered in a corresponding line of the port-value column 1202 of the detected-device table 1220.

Then, in step S1506, the MIBReadObjects function 902 is called in order to acquire information relating to optional equipment mounted on the network device. The acquired value of the MIB object differs depending on the device type obtained in step S1503. More specifically, when the device type is, for example, a copier, the values of MIB objects relating to an input cassette, an output cassette, a sorter and the like are inquired. When the device type is a small LBP, since it is known that an output cassette and a sorter are not mounted, the value of the MIB object relating to an input cassette is inquired. According to these inquiries, the communication operations 1104 and 1106 shown in FIG. 11 are performed.

As described above, if the result of the determination in step S1504 is affirmative, the process proceeds to step S1507. In step S1507, first, the network-address column of the immediately-preceding-detected-device table 1230 is searched using the network address in the first argument of the call-back function. The contents of the equipment-information column for the coincident line are entered in the equipment-information column for the line having the same network address in the detected-device table 1220.

Since the equipment information indicating what optional equipment is mounted on the network device does not change while electric power is supplied, information obtained ion the immediately preceding search may be used without causing any problem. By thus using information obtained in the immediately preceding search, it is unnecessary to again inquire of the network device about mounting information, so that network traffic can be reduced.

As described above, if the result of the determination in step S1502 is negative, the process proceeds to step S1508. In step S1508, the response packet is abandoned because effective information cannot be obtained from this response packet.

As described above, if the result of the determination in step S1501 is negative, the process proceeds to step S1509. This is the same as in the case of the communication processes 1105 and 1107 shown in FIG. 11. In step S1509, it is determined if the received response packet is a normal response. If the result of the determination in step S1509 is negative, the process proceeds to step S1511. In step S1511, the received packet is abandoned because effective information cannot be obtained from this response packet.

If the result of the determination in step S1509 is affirmative, the process proceeds to step S1510. In step S1510, the received contents are registered in the network device. More specifically, since in step S1506, the value of the MIB object is inquired in accordance with the device type in order to acquire information relating to the optional equipment mounted on the network device, the information relating to the optional equipment is registered in the equipment-information column 1205 of the detected-device table 1220 in accordance with the obtained value.

Figure 16:
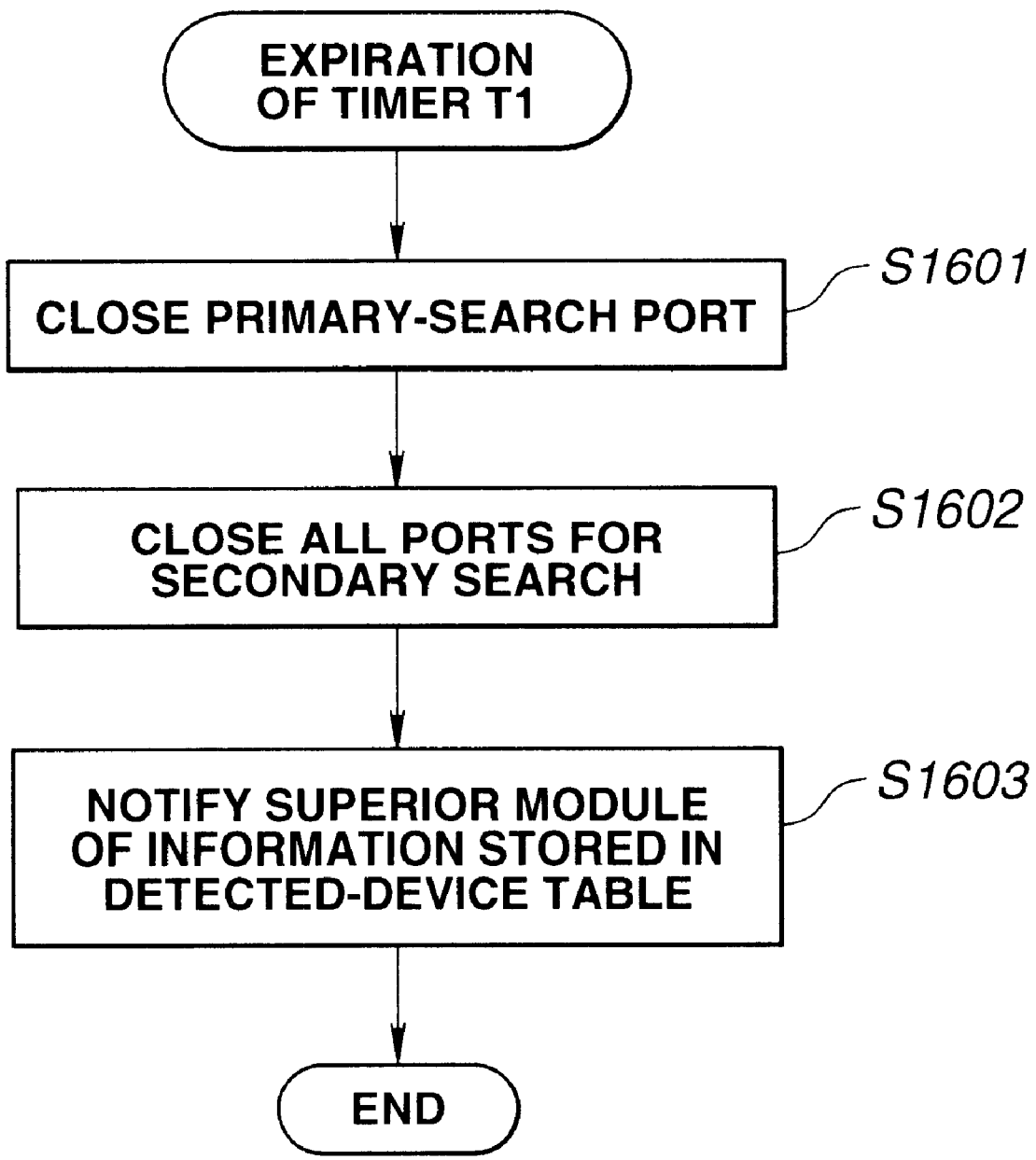
FIG. 16 is a flowchart illustrating processing when a device-response timer has expired in the first embodiment.

FIG. 16 is a flowchart illustrating the processing when the device-response timer T1 has expired. The timer service is provided by the OS. When the time assigned by the timer has elapsed, the OS calls this procedure.

The procedure shown in FIG. 16 corresponds to the processing of step S1304 shown in FIG. 13. In the processing for expiration of the device-response timer T1, first, in step S1601, the primary search port is closed. More specifically, since in step S1403, the port value of the port opened using the MIBOpen function is stored in the RAM 503 shown in FIG. 5, the MIBClose function is called using the port value as the argument. At the same time, the port value stored in the RAM 503 is cleared to a value NULL.

Then, in step S1602, all secondary search ports are closed. More specifically, the port-value column 1202 of the detected-device table 1220 is scanned from above to below, and the MIBClose function is called using each port value as the argument. At the same time, in order to indicate that the ports are closed, the value of each line of the port-value column of the detected-device table 1220 is cleared to a value NULL.

Finally, in step S1603, information stored in the detected-device table 1220 is notified to a superior module. More specifically, the number of network devices registered in the detected-device table 1220, i.e., the number of lines of the detected-device table 1220, and the leading address of the detected-device table 1220 in the RAM 503 are notified to the superior module. The superior module displays the summary of the detected network devices on the display 510 shown in FIG. 5 based on the notified information.

Figure 17:
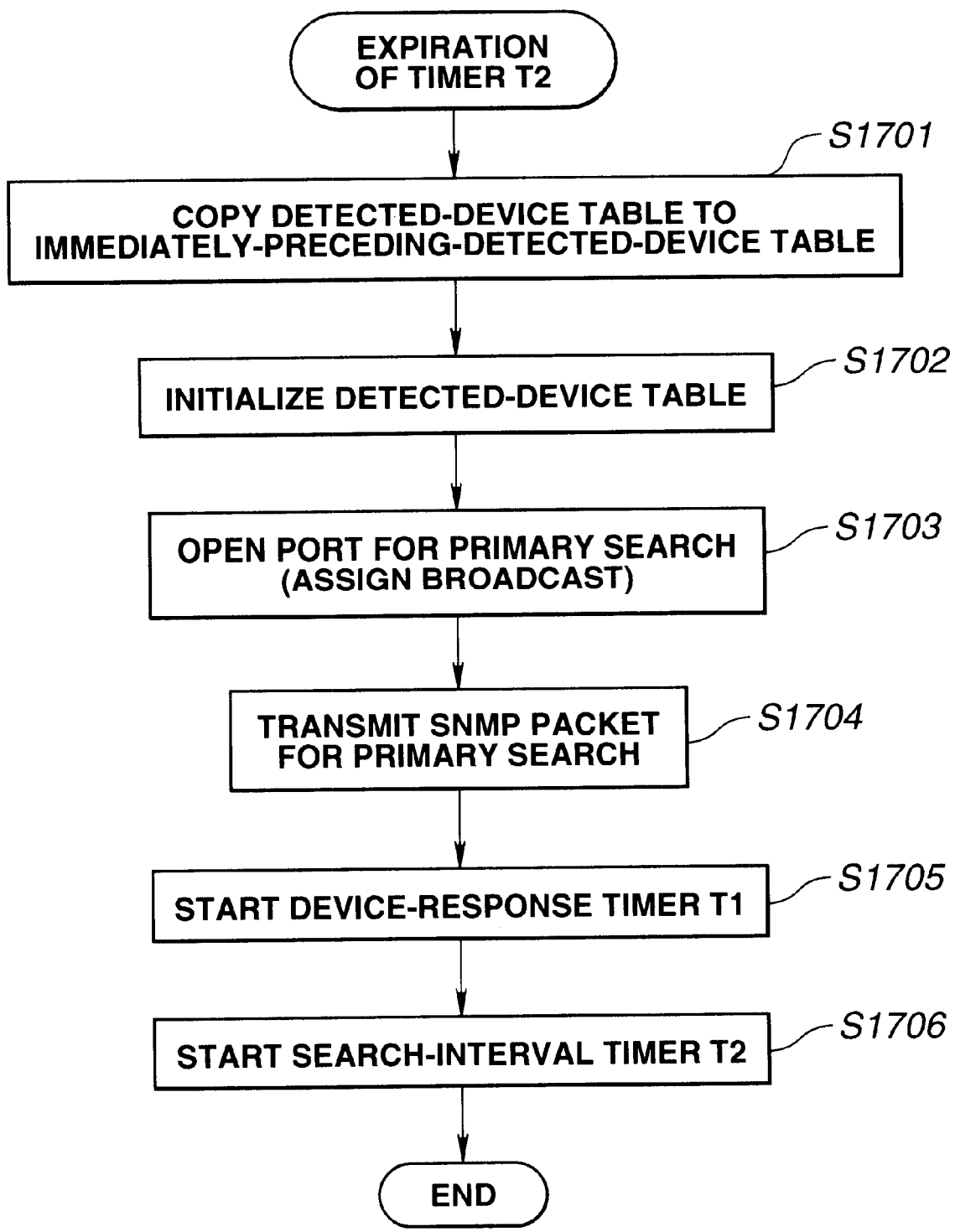
FIG. 17 is a flowchart illustrating processing when a search-interval timer has expired in the first embodiment.

FIG. 17 is a flowchart illustrating processing when the search-interval timer T2 has expired. The timer service is provided by the OS, and the OS calls this procedure when the time assigned by the timer has elapsed.

The procedure shown in FIG. 17 corresponds to the processing of step S1305 shown in FIG. 13. In the processing for expiration of the search-interval timer T2, first, in step S1701, the information of the detected-device table 1220 is copied to the immediately-preceding-detected-device table 1230 in order to use the result of the immediately preceding search for the next search.

Since the processing from step S1702 to step S1706 is the same as the processing from step S1402 to step S1406 shown in FIG. 14, further description thereof will be omitted.

Second Embodiment

Figure 19:
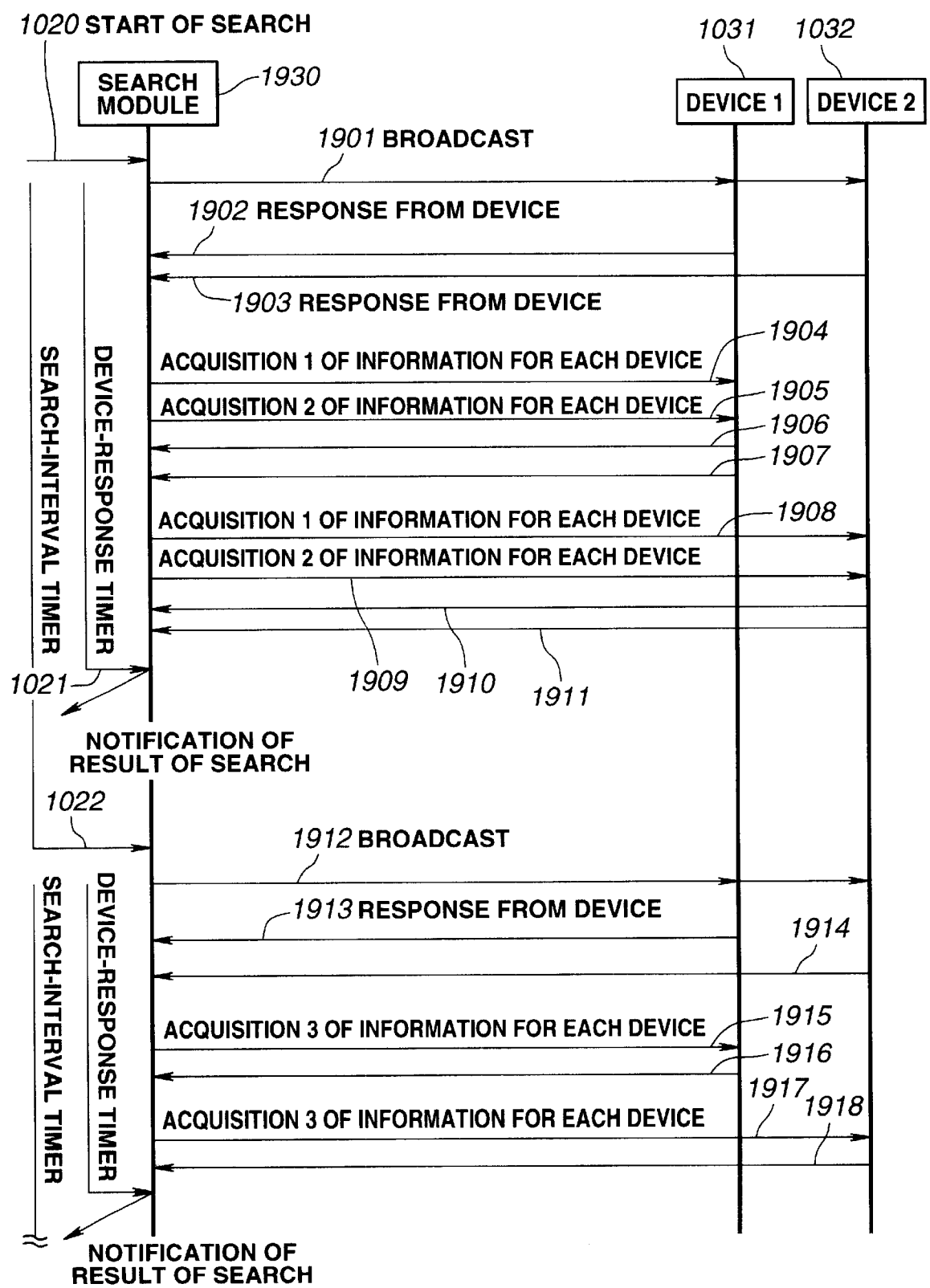
FIG. 19 is a diagram illustrating a communication sequence between a search module and network devices according to a second embodiment of the present invention.

FIG. 19 is a diagram illustrating a communication sequence between network management software and network devices on a network according to a second embodiment of the present invention. Particularly, FIG. 19 illustrates a manner in which a search module 1930 searches a network device present on the network. Processes 1020, 1021, 1022, 1031 and 1032 shown in FIG. 19 are the same as the processes having the same reference numerals shown in FIG. 10.

In FIG. 19, search module 1930 indicates a search module of the network management software according to the second embodiment, and is equivalent to search module 604 shown in FIG. 6. As other modules in the network management software, this search module 1930 is executed by the CPU 501 shown in FIG. 5 in the PC 103 shown in FIG. 1.

FIGS. 20A and 20B are diagrams illustrating the data structures of a detected-device table 2020 and an immediately-preceding-detected-device table 2030 which are used by the search module 1930 in order to store information relating to detected devices. These data structures are held in the RAM 503 shown in FIG. 5.

Information relating to detected network devices is registered in the detected-device table 2020. Every time a network device has been detected, a line is added to the detected-device table 2020.

Information registered in the detected-device table will now be described. The network address of each detected network device is registered in a network-address column 2001. A port value transmitted from the MIBOpen function 901 provided by the MIB module 610 is registered in a port column 2002.

The type of the network device is registered in a device-type column 2003. The current state of the network device is registered in a state-of-device column 2004. Optional equipment mounted on the network device is registered in an equipment-information column 2005. Information relating to the sheet size is registered in a sheet-size column 2006.

More specifically, in FIG. 20A, two network devices are registered in the detected-device table 1220. The first network device has a network address of 192.1.16.130. The port value for communicating with this network device is 0x12FE. The device type of this network device is an "LBP", and a "2,000-sheet deck" is mounted as an optional equipment. The state of the device is "Ready". The sheet size is A4.

The second network device has a network address of 192.1.16.150. The port value for communicating with this network device is 0x2501. The device type of this network device is a "Copier", and a "Sorter" is mounted as optional equipment. It can be understood from the state of the device that "Jam" is currently generated.

In the above-described information, the port 2002 and the state of the device 2004 change with time. A unique value is allocated to the port every time the search module 1930 calls the MIBOpen function 901. The state of the device indicates the current state of the network device, and changes with a change in the state of the network device.

The immediately-preceding-detected-device table 2030 (shown in FIG. 20B) holds information relating to the network device detected in the preceding search. Since the immediately-preceding-detected-device table 2030 has the same data structure as the detected-device table 1220, futher description thereof will be omitted.

How to use these tables will be described in detail with reference to flowcharts (to be described later).

Figure 21:
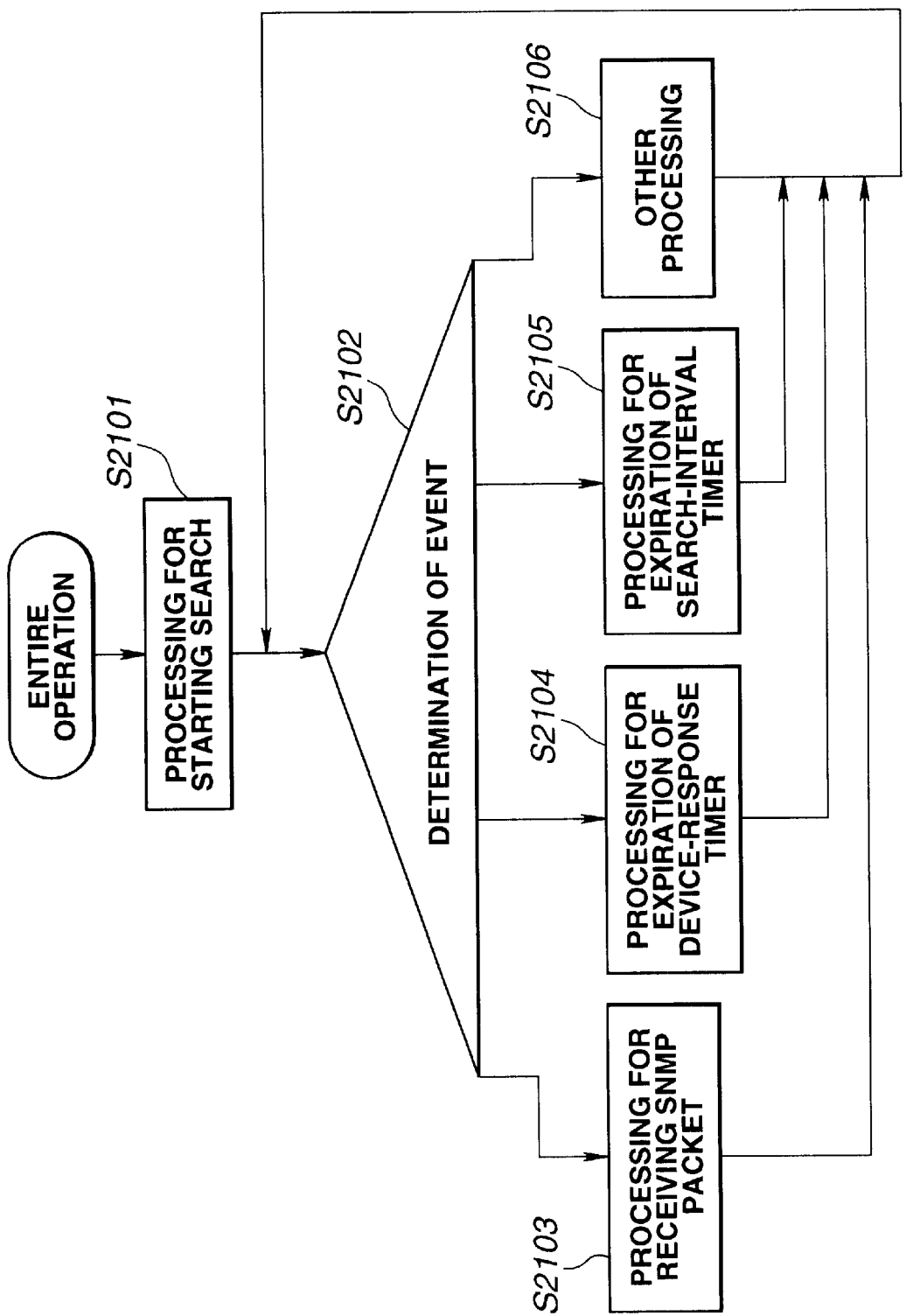
FIG. 21 is a flowchart illustrating the operation of the entirety of network management software in the second embodiment.

FIG. 21 is a flowchart illustrating the entirety of the operation of the network management software executed in the PC 103. When the program has been started, first, in step S2101, processing for starting search of a network device is performed. Then, in step S2102, it is determined whether the generated event is reception of an SNMP packet (response packet), expiration of the device-response timer, expiration of the search-interval timer, or other event (including generation of no event).

The process proceeds to an appropriate step (from among steps S2103–S2106) in accordance with the generated event. Upon completion of processing in each step, the process returns to step S2102.

Figure 22:
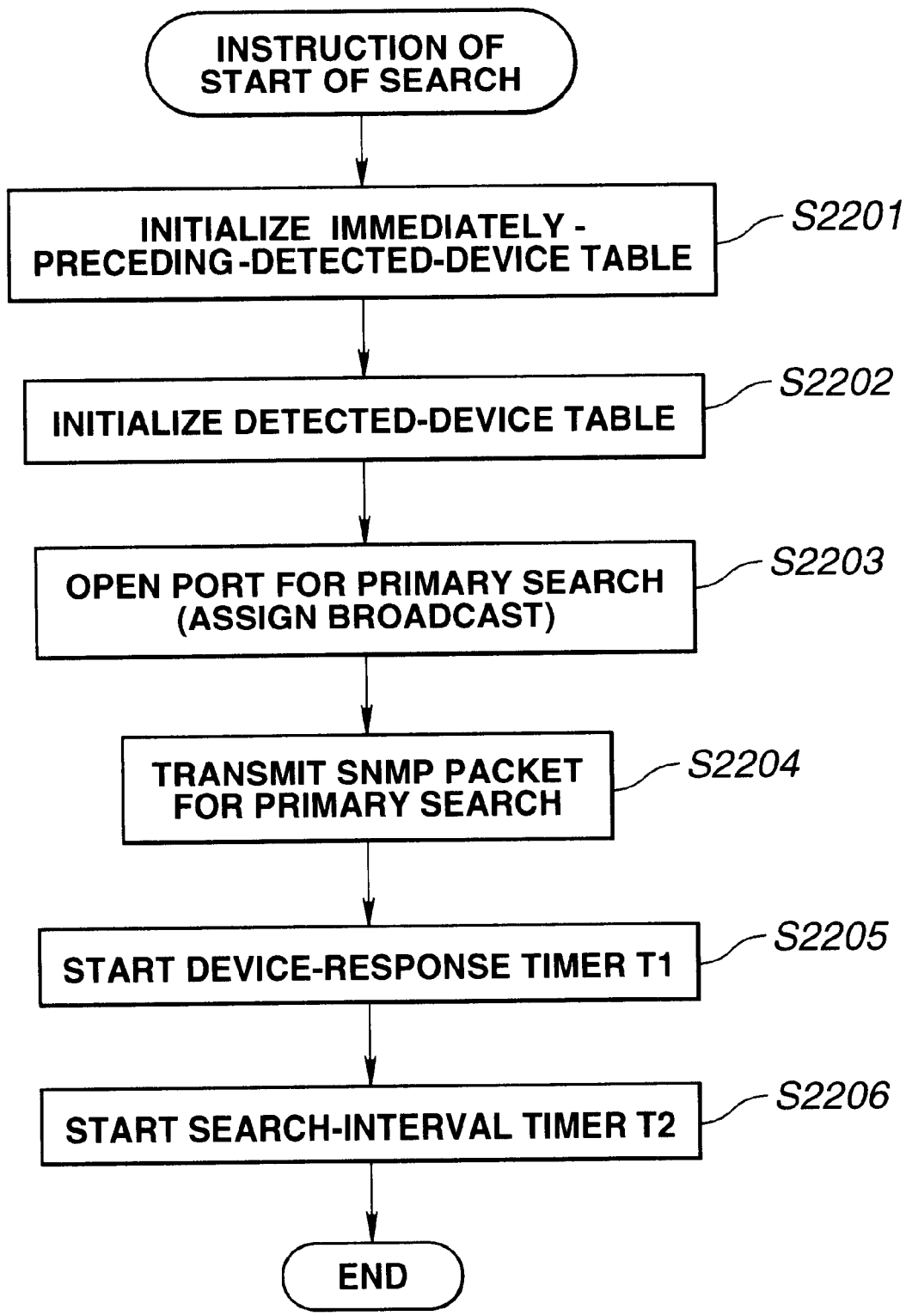
FIG. 22 is a flowchart illustrating the operation when a search module starts to search network devices in the second embodiment.

FIG. 22 is a flowchart illustrating the operation when the search module 604 starts search. This processing corresponds to the processing of step S2101 shown in FIG. 21. First, in step S2201, all of the contents of the immediately-preceding-detected-device table are erased to initialize the table. Then, in step S2202, all of the contents of the detected-device table are erased to initialize the table.

Then, the process proceeds to step S2203, where a port for primary search is opened according to a broadcast address by calling the MIBOpen function 901 provided by the MIB module 610 shown in FIG. 6, and the value of the port is stored in the RAM 503 shown in FIG. 1. The port for primary search is termed a primary search port.

Then, in step S2204, the MIBReadObject function 902 is called by using the port value obtained in step S2203 as an argument. At that time, two MIB object keys relating to the device type and the state of the device are assigned as MIB objects. Thus, the communication 1901 shown in FIG. 19 is performed.

Since the address in the communication 1901 is a broadcast address, the contents of the communication are transmitted to all network devices connected to the LAN 100 shown in FIG. 1, including, of course, the devices 101 and 118, i.e., the devices 1031 and 1032 shown in FIG. 11.

Then, in step S2205, the device-response timer T1 is started. Then, in step S2206, the search-interval timer T2 is started.

Figure 23:
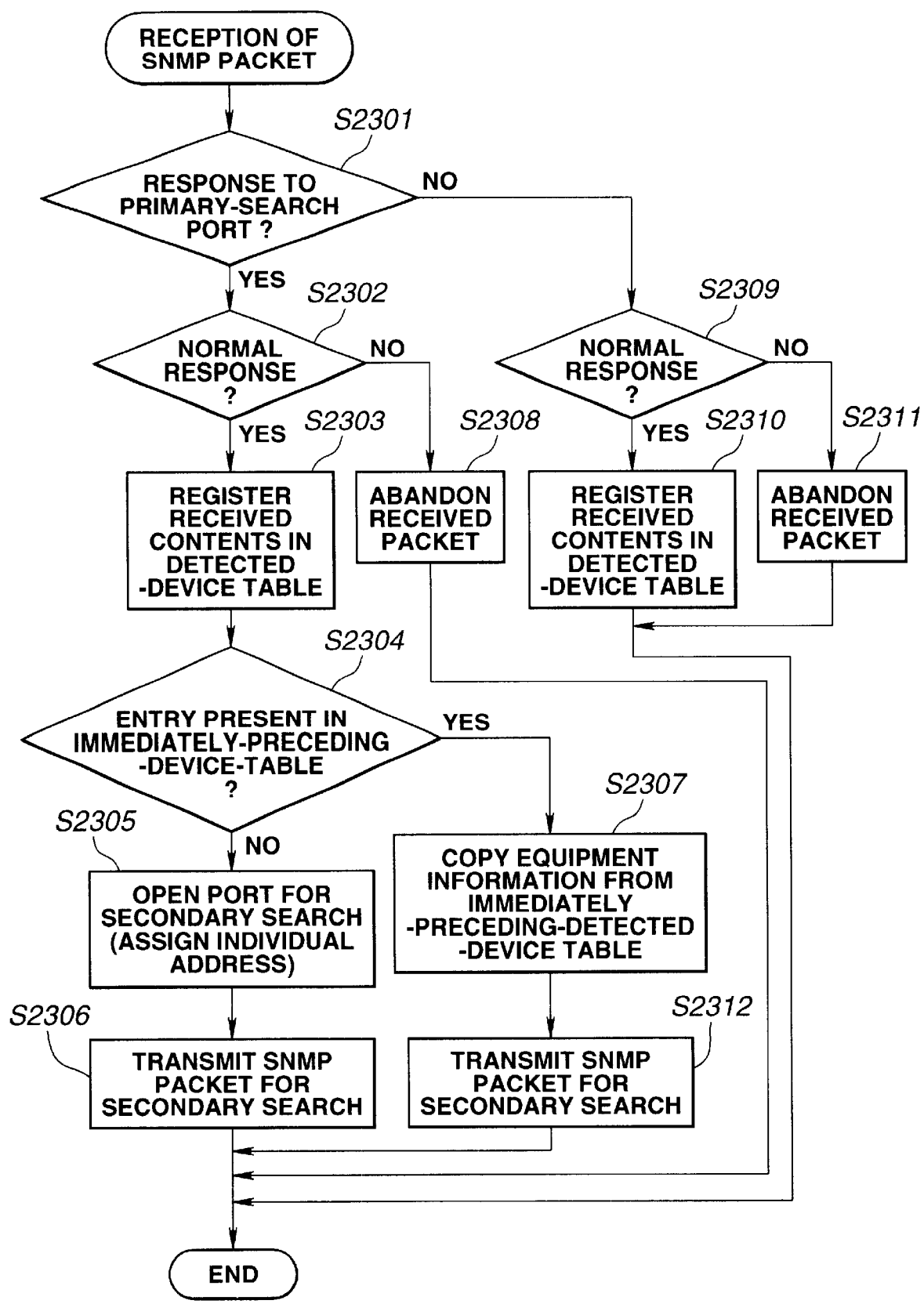
FIG. 23 is a flowchart illustrating processing when an SNMP packet has been received in the second embodiment.

FIG. 23 is a flowchart illustrating the operation performed when an SNMP packet is received. This processing corresponds to the processing in step S2103 shown in FIG. 21. This operation is performed when an SNMP packet has been received in communication processes 1902, 1903, 1906, 1907, 1910, 1911, 1913, 1914, 1916 and 1918 shown in FIG. 19.

When an SNMP packet has been received, first, in step S2301, it is determined if the received packet is a response packet for a primary search port. In this process, it is determined if the port value of the second argument relating to a call-back function of the search module called when the SNMP packet has been received corresponds to the port value stored in step S2203 shown in FIG. 22. If the result of the determination in step S2301 is affirmative, the process proceeds to step S2302 assuming that the communication is for the primary port. If the result of the determination in step S2301 is negative, the process proceeds to step S2309. In FIG. 19, the processes 1902, 1903, 1913 and 1914 represent communication to the primary search port.

Then, in step S2302, it is determined if the response is a normal response. The normal response indicates that, as described with reference to FIG. 7, the error status 713 of the SNMP packet is 0. If the result of the determination in step S2302 is affirmative, the process proceeds to step S2303. If the result of the determination in step S2302 is negative, the process proceeds to step S2308. In step S2309, the same determination as in step S2302 is also performed.

In step S2303, the received contents are registered in the detected-device table 2020. Since both the device type and the state of the device have been assigned as the MIB objects in step S2203 shown in FIG. 22, the received contents include the values of these two MIB objects. Accordingly, these two values and the network address in the first argument of the call-back function are registered in the detected-device table 2020.

Then, in step S2304, it is determined if the network address in the first argument of the call-back function is registered in the network-address column 2011 of the immediately-preceding-detected-device table 2030. If the result of the determination in step S2304 is negative, the process proceeds to step S2305. If the result of the determination in step S2304 is affirmative, the process proceeds to step S2307.

In step S2305, a port is opened in order to individually perform communication for each network device. In the second embodiment, this port is termed a secondary search port. More specifically, the MIBOpen function is called using the network address of the network device detected in step S2303 as an argument, and the transmitted port value is registered in a corresponding line of the port-value column 2002 of the detected-device table 2020.

Then, in step S2306, the MIBReadObjects function 902 is called in order to acquire information relating to optional equipment mounted on the network device. The acquired value of the MIB object differs depending on the device type obtained in step S2303. More specifically, when the device type is, for example, a copier, the values of MIB objects relating to an input cassette, an output cassette, a sorter and the like are inquired. When the device type is a small LBP, since it is known that an output cassette and a sorter are not mounted, the value of the MIB object relating only to an input cassette is inquired. According to these inquiries, the communication processes 1904 and 1906 shown in FIG. 19 are performed.

In order to acquire more detailed information relating to the network device, information relating to the sheet size which indicates paper size in the paper cassette is inquired. According to this inquiry, the communication processes 1905 and 1909 shown in FIG. 19 are performed. Accordingly, in step S2306, the SNMP packet is transmitted twice to the same network device.

As described above, if the result of the determination in step S2304 is affirmative, the process proceeds to step S2307. In step S2307, first, the network-address column of the immediately-preceding-detected-device table 2030 is searched using the network address in the first argument of the call-back function. The contents of the equipment-information column for the coincident line are entered in the equipment-information column for the line having the same network address in the detected-device table 2020.

Since the equipment information indicating what optional equipment is mounted on the network device does not change while electric power is supplied, information obtained in the immediately preceding search may be used without causing any problem. That is, it is only necessary to again acquire information which may change.

Accordingly, in step S2312, only information which has changed is inquired. More specifically, for example, information relating to the sheet size is inquired. According to this inquiry, the communication processes 1915 and 1917 shown in FIG. 19 are performed. By thus using information obtained in the immediately preceding search, it is unnecessary to again inquire of the network device about mounting information, so that network traffic can be reduced.

As described above, if the result of the determination in step S2302 is negative, the process proceeds to step S2308. In step S2308, the response packet is abandoned because effective information cannot be obtained from the response packet.

As described above, if the result of the determination in step S2301 is negative, the process proceeds to step S2309. This is the same as in the case of the communication processes 1906, 1907, 1910, 1911, 1916 and 1918 shown in FIG. 19. In step S2309, it is determined if the received response packet is a normal response. If the result of the determination in step S2309 is negative, the process proceeds to step S2311. In step S2311, the received packet is abandoned because effective information cannot be obtained from this response packet.

If the result of the determination in step S2309 is affirmative, the process proceeds to step S2310. In step S2310, the received contents are registered in the detected-device table 2020. More specifically, since in step S2306, the value of the MIB object is inquired in accordance with the device type in order to acquire information relating to the optional equipment mounted on the network device and information relating to the sheet size, the information relating to the optional equipment and the information relating to the sheet size are registered in the equipment information column and the sheet-size column of the detected-device table 2020 in accordance with the obtained value.

In the second embodiment, since the value of the MIB object relating to the sheet size is inquired in step S2312 in order to acquire information relating to the sheet size, the obtained value is registered in the sheet-size column of the detected-device table 2020.

Figure 24:
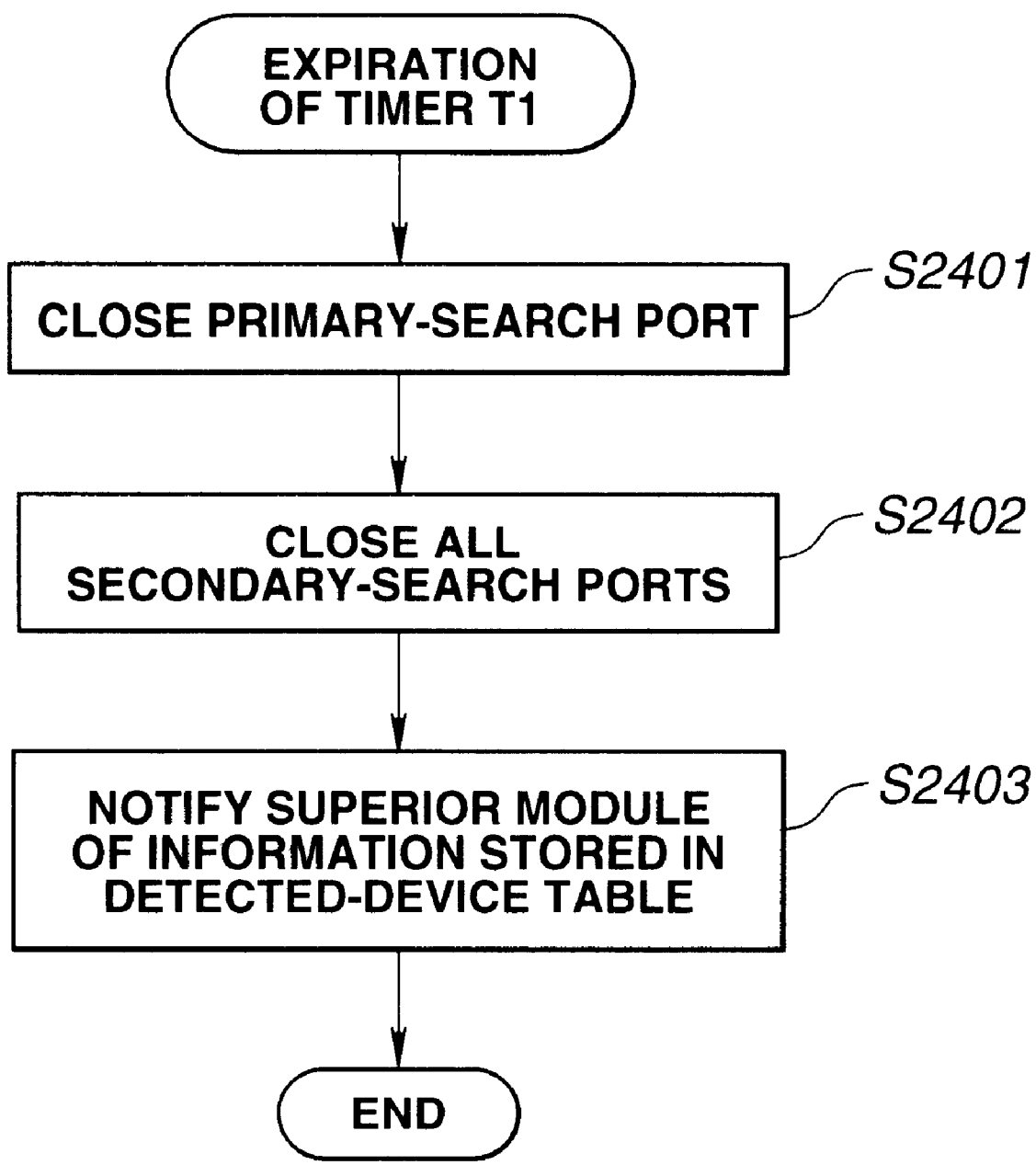
FIG. 24 is a flowchart illustrating processing when a device-response timer has expired in the second embodiment.

FIG. 24 is a flowchart illustrating the processing when the device-response timer T1 has expired. The timer service is provided by the OS. When the time assigned by the timer has elapsed, the OS calls this procedure.

The procedure shown in FIG. 24 corresponds to the processing of step S2104 shown in FIG. 21. In the processing for expiration of the device-response timer T1, first, in step S2401, the primary search port is closed. More specifically, since in step S2203, the port value of the port opened using the MIBOpen function is stored in the RAM 503 shown in FIG. 5, the MIBClose function is called using the port value as the argument. At the same time, the port value stored in the RAM 503 is cleared to a value NULL.

Then, in step S2402, all secondary search ports are closed. More specifically, the port-value column 2002 of the detected-device table 2020 is scanned from above to below, and the MIBClose function is called using each port value as the argument. At the same time, in order to indicate that the ports are closed, the value of each line of the port-value column of the detected-device table 2020 is cleared to a value NULL.

Finally, in step S2403, information stored in the detected-device table 2020 is notified to a superior module. More specifically, the number of network devices registered in the detected-device table 2020, i.e., the number of lines of the detected-device table 2020, and the leading address of the detected-device table 2020 in the RAM 503 are notified to the superior module. The superior module displays the summary of the detected network devices on the display 510 shown in FIG. 5 based on the notified information.

Figure 25:
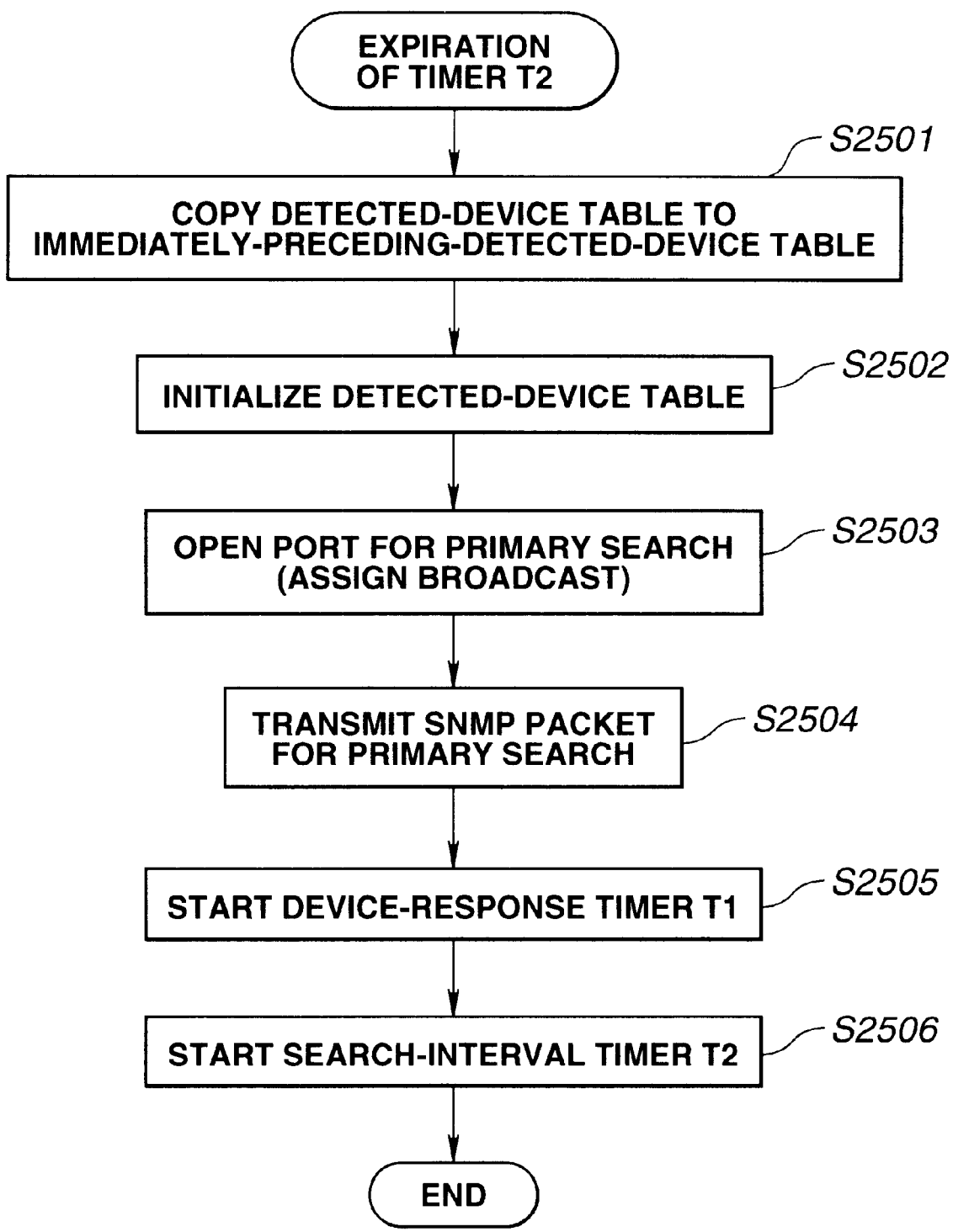
FIG. 25 is a flowchart illustrating processing when a search-interval timer has expired in the second embodiment.

FIG. 25 is a flowchart illustrating processing when the search-interval timer T2 has expired. The timer service is provided by the OS, and the OS calls this procedure when the time assigned by the timer has elapsed.

The procedure shown in FIG. 25 corresponds to the processing of step S2105 shown in FIG. 21. In the processing for expiration of the search-interval timer T2, first, in step S2501, the information of the detected-device table 2020 is copied to the immediately-preceding-detected-device table 2030 in order to use the result of the immediately preceding search for the next search.

Since the processing from step S2502 to step S2506 is the same as the processing from step S2202 to step S2206 shown in FIG. 22, further description thereof will be omitted.

Third Embodiment

The above-described network management software according to the present invention may be operated in a state in which a program installed from the outside is executed by the PC 500. In this case, by loading a group of information including the program from an external storage medium, such as a CD-ROM, a flash memory, a floppy disk or the like, into the RAM 503 of the PC 500 via the storage medium or a network, such as electronic mail, PC communication or the like, the program is supplied to the PC 500. The present invention may also be applied to such a case.

Figure 18:
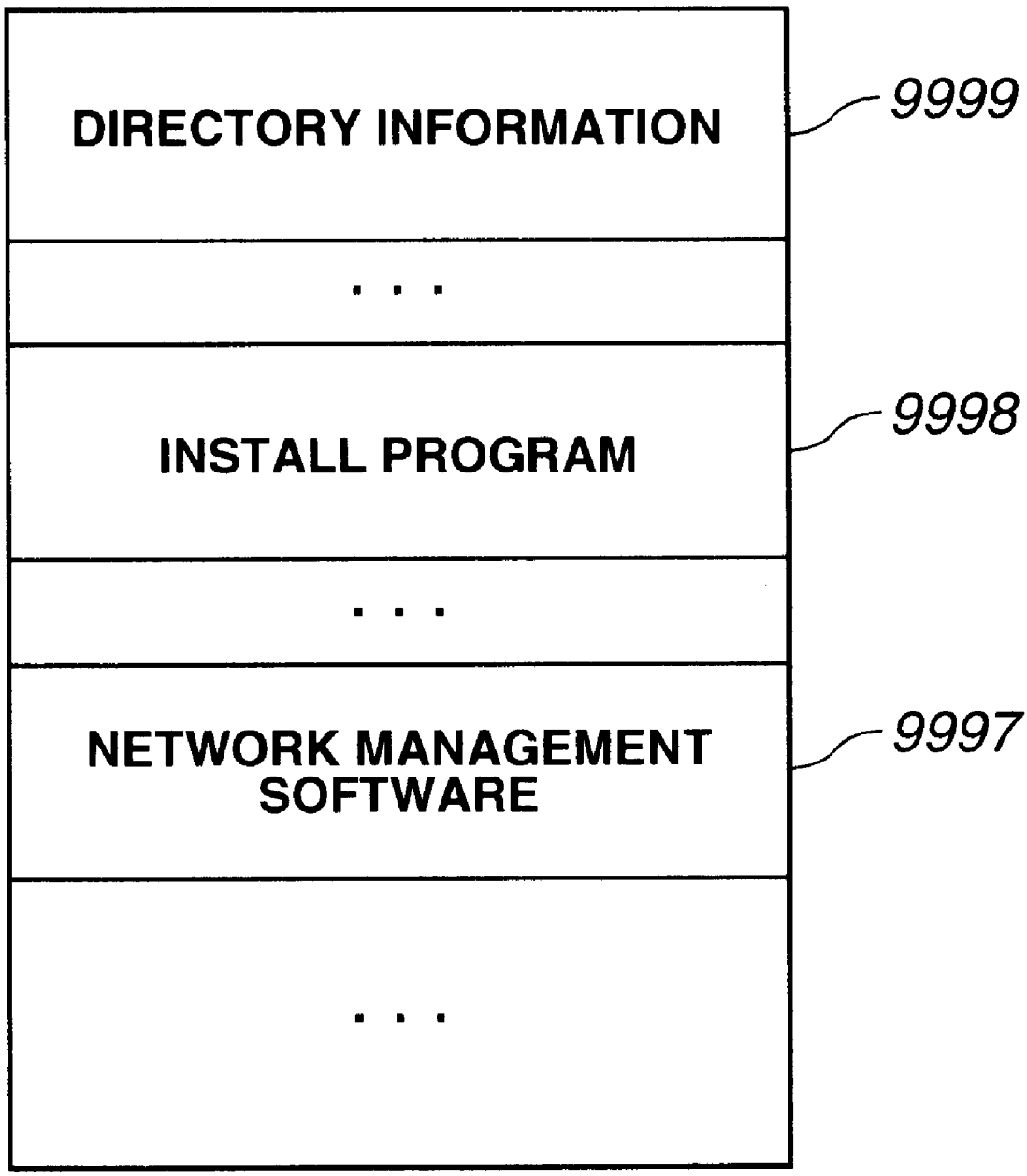
FIG. 18 is a diagram illustrating a memory map in a storage medium storing network management software according to the present invention.

FIG. 18 is a diagram illustrating a memory map of a CD-ROM, serving as the storage medium. Reference numeral 9999 represents a region storing directory information. The region 9999 stores the positions of a region 9998 storing an install program and a region 9997 storing network management software which follow.

When the network management software according to the present invention is installed, first, the install program is loaded in the system of the PC 500, and is executed by the CPU 501. The install program to be executed by the CPU 501 reads the network management software from the region 9997 storing the network management software and stores the read software in the hard disk 511.

The present invention may be applied to a system or an integrated apparatus comprising a plurality of apparatuses (such as a host computer, an interface apparatus, a reader and the like), or to an apparatus comprising a single unit.

The objects of the present invention may, of course, also be achieved by supplying a system or an apparatus with a storage medium storing program codes of software for realizing the functions of the above-described embodiments, and reading and executing the program codes stored in the storage medium by means of a computer (or a CPU or an MPU (microprocessor unit)) of the system or the apparatus.

In such a case, the program codes themselves read from the storage medium realize the functions of the above-described embodiments, so that the storage medium storing the program codes constitutes the present invention.

For example, a floppy disk, a hard disk, an optical disk, a magnetooptical disk, a CD-ROM, a CD-R(recordable), a magnetic tape, a nonvolatile memory card, a ROM or the like may be used as the storage medium for supplying the program codes.

The present invention may, of course, be applied not only to a case in which the functions of the above-described embodiments are realized by executing program codes read by a computer, but also to a case in which an OS or the like operating in a computer executes a part or the entirety of actual processing, and the functions of the above-described embodiments are realized by the processing.

The present invention may, of course, be applied to a case in which, after writing program coded read from a storage medium into a memory provided in a function expanding card inserted into a computer or in a function expanding unit connected to the computer, a CPU or the like provided in the function expanding card or the function expanding unit performs a part or the entirety of actual processing, and the functions of the above-described embodiments are realized by the processing.

The present invention may, of course, be applied to a case in which a program is distributed from a storage medium recording program codes of software realizing the functions of the above-described embodiments to a requester via a communication line for PC communication or the like.

As described above, according to the present invention, as for a network device whose information has already been acquired at the first search, only information which can change with time is acquired at the second or succeeding search. As for information which cannot change, by using information acquired at the first search by copying that information, acquisition of information and communication of response for the search are not performed at the second or succeeding search.

By thus transmitting and receiving only necessary packets in a search sequence of a network device, it is possible to prevent crowded network traffic.

The individual components shown in outline or designated by blocks in the drawings are all well known in the network-device management apparatus and method, and recording medium arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A network-device management apparatus comprising:

first search means for searching for and detecting at least one device connected to a network;

first acquisition means for acquiring, from the at least one device detected by said first search means, a value of each of a plurality of device attributes relating to the at least one device detected by said first search means, the plurality of device attributes including a first type of device attribute and a second type of device attribute;

storage means for storing in a memory the value of each of the plurality of device attributes relating to the at least one device detected by said first search means;

second search means for searching and detecting the at least one device connected to the network; and second acquisition means for acquiring, from the at least one device detected by said second search means, a value of the first type of device attribute relating to the at least one device detected by said second search means and acquiring from the memory the stored value of the second type of device attribute relating to the at least one device detected by said second search means.

2. An apparatus according to claim 1, wherein said second search means sends a request to search the at least one device for a value of the first type of device attribute, and said second acquisition means receives a response including the value of the first type of device attribute from the at least one device connected to the network.

3. An apparatus according to claim 2, wherein the value of the first type of device attribute can change with time.

4. An apparatus according to claim 1, further comprising display means for displaying the value of the first type of device attribute and the value of the second type of device attribute, wherein the value of the first type of device attribute and the value of the second type of device attribute are acquired by said second acquisition means.

5. An apparatus according to claim 1, wherein said acquisition means acquires MIB (Management Information Base) information using an SNMP (Simple Network Management Protocol).

6. A network-device management method comprising:

a first search step of searching for and detecting at least one device connected to a network;

a first acquisition step of acquiring, from the at least one device detected in said first search step, a value of each of a plurality of device attributes relating to the at least one device detected in said first search step, the plurality of device attributes including a first type of device attribute and a second type of device attribute;

a storage step of storing in a memory the value of each of the plurality of device attributes relating to the at least one device detected in said first search step;

a second search step of searching for and detecting the at least one device connected to the network; and a second acquisition step of acquiring, from the at least one device detected in said second search step, a value of the first type of device attribute relating to the at least one device detected in said second search step and acquiring from the memory the stored value of the second type of device attribute relating to the at least one device detected in said second search step.

7. A method according to claim 6, wherein said second search step comprises a step of sending a request to search the at least one device for a value of the first type of device attribute, and said second acquisition step comprises a step of receiving a response including the value of the first type of device attribute from the at least one device connected to the network.

8. A method according to claim 7, wherein the value of the first type of device attribute can change with time.

9. A method according to claim 6, further comprising a display step of displaying the value of the first type of device attribute and the value of the second type of device attribute on display means, wherein the value of the first type of device attribute and the value of the second type of device attribute are acquired in said second acquisition step.

10. A method according to claim 6, wherein said acquisition step acquires MIB information using an SNMP (Simple Network Management Protocol).

11. A storage medium capable of being read by a computer, which medium stores a program to be executed by the computer, said program comprising:

a first search step of searching for and detecting at least one device connected to a network;

a first acquisition step of acquiring, from the at least one device detected in said first search step, a value of each of a plurality of device attributes relating to the at least one device detected in said first search step, the plurality of device attributes including a first type of device attribute and a second type of device attribute;

a storage step of storing in a memory the value of each of the plurality of device attributes relating to the at least one device detected in said first search step;

a second search step of searching for and detecting the at least one device connected to the network; and a second acquisition step of acquiring, from the at least one device detected in said second search step, a value of the first type of device attribute relating to the at least one device detected in said second search step and acquiring from the memory the stored value of the second type of device attribute relating to the at least one device detected in said second search step.

12. A storage medium according to claim 11, wherein said second search step comprises a step of sending a request to search the at least one device for a value of the first type of device attribute, and said second acquisition step comprises a step of receiving a response including the value of the first type of device attribute from the at least one device connected to the network.

13. A storage medium according to claim 12, wherein the value of the first type of device attribute can change with time.

14. A storage medium according to claim 11, wherein said program further comprises a display step of displaying the value of the first type of device attribute and the value of the second type of device attribute on display means, wherein the value of the first type device attribute and the value of the second type of device attribute are acquired in said second acquisition step.

15. A storage medium according to claim 11, wherein said acquisition step acquires MIB information using a SNMP (Simple Network Management Protocol).

* * * * *